US012416401B2

(12) United States Patent
Freeland

(10) Patent No.: US 12,416,401 B2
(45) Date of Patent: *Sep. 16, 2025

(54) FOOD CARRIER THAT PROJECTS ONE OR MORE DECORATIVE SILHOUETTES AND ASSOCIATED METHODS OF MANUFACTURE

(71) Applicant: Brian Freeland, Chandler, AZ (US)

(72) Inventor: Brian Freeland, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,046

(22) Filed: Apr. 18, 2024

(65) Prior Publication Data

US 2025/0043949 A1 Feb. 6, 2025

Related U.S. Application Data

(63) Continuation-in-part of application No. 18/230,108, filed on Aug. 3, 2023, now Pat. No. 11,986,074.

(51) Int. Cl.

*F21V 33/00* (2006.01)
*B65D 1/16* (2006.01)
(Continued)

(52) U.S. Cl.

CPC ............ *F21V 33/0004* (2013.01); *B65D 1/16* (2013.01); *B65D 25/02* (2013.01); *B65D 25/32* (2013.01); *B65D 25/54* (2013.01); *F21L 4/00* (2013.01); *F21V 23/0407* (2013.01); *F21Y 2115/10* (2016.08)

(58) Field of Classification Search

CPC ..... F21V 33/004; F21V 23/0407; B65D 1/16; B65D 25/02; B65D 25/32; B65D 25/54; F21L 4/00

See application file for complete search history.

(56) References Cited

U.S. PATENT DOCUMENTS 4,698,732 A 10/1987 Hickey
4,714,985 A 12/1987 Hickey et al.
(Continued)

FOREIGN PATENT DOCUMENTS

CN 201257301 Y 6/2009
KR 200452205 Y1 2/2011

OTHER PUBLICATIONS

US Trademark Registration No. 4145999; Mark—Blazing Ledz Filing date: Sep. 16, 2011 Registration date: May 22, 2012.
(Continued)

*Primary Examiner* — Thomas M Sember
(74) *Attorney, Agent, or Firm* — LEGALFORCE RAPC

(57) ABSTRACT

Food carriers and methods of manufacture of the same are described, and more particularly to a food carrier that projects one or more decorative silhouettes and associated methods of manufacture. In one embodiment, an apparatus includes a bucket formed of a translucent material in which a light source within the bucket illuminates the bucket interiorly and exteriorly. The translucent material of the bucket may permit the light from the light source to pass through the bucket to a region exterior to the bucket. The apparatus may include at least one decorative opening along the surface of the exterior wall to permit the light to pass through to the region exterior to the bucket, which may generate a decorative silhouette that emanates from the exterior wall of the bucket and project to the region exterior to the bucket.

20 Claims, 16 Drawing Sheets

FOOD CARRIER 1300

(51) Int. Cl.

| | |
|---|---|
| ***B65D 25/02*** | (2006.01) |
| ***B65D 25/32*** | (2006.01) |
| ***B65D 25/54*** | (2006.01) |
| ***F21L 4/00*** | (2006.01) |
| ***F21V 23/04*** | (2006.01) |
| ***F21Y 115/10*** | (2016.01) |

(56) References Cited

U.S. PATENT DOCUMENTS

| | | | |
|---|---|---|---|
| 4,802,071 | A | 1/1989 | Schuster |
| 4,926,296 | A | 5/1990 | Blume et al. |
| 5,467,918 | A | 11/1995 | Glover |
| 5,597,230 | A | 1/1997 | Newman |
| 5,984,754 | A | 11/1999 | Freelander |
| 6,092,905 | A | 7/2000 | Koehn |
| 6,200,000 | B1 | 3/2001 | Burnidge |
| 6,224,234 | B1 | 5/2001 | Demmery |
| 6,270,233 | B1 | 8/2001 | Holland |
| 6,619,810 | B2 | 9/2003 | Kramer et al. |
| 6,789,932 | B2 | 9/2004 | Healy |
| 6,808,286 | B1 | 10/2004 | Backes et al. |
| 6,869,199 | B1 | 3/2005 | Burnidge |
| 7,311,415 | B1 | 12/2007 | Burnidge |
| 8,579,459 | B2 | 11/2013 | Ma et al. |
| 9,022,595 | B1 | 5/2015 | Schilling et al. |
| 9,181,023 | B2 | 11/2015 | Clinton |
| D788,467 | S | 6/2017 | Ma |
| 11,986,074 | B1 | 5/2024 | Freeland |
| 2003/0086260 | A1 | 5/2003 | Terrell et al. |
| 2005/0045513 | A1 | 3/2005 | Won et al. |
| 2007/0236922 | A1 | 10/2007 | Sheehan et al. |
| 2016/0010844 | A1 | 1/2016 | Ma |
| 2019/0183061 | A1 | 6/2019 | Huang |

OTHER PUBLICATIONS

US Trademark Registration No. 5412918; Mark—Shawshank Ledz Filing date: Aug. 9, 2017 Registration date: Feb. 27, 2018.

US Trademark Registration No. 4244511; Mark—Blacklight Master Filing date: Sep. 16, 2011 Registration date: Nov. 20, 2012.

US Trademark Registration No. 4025874; Mark—Scorpion Master Filing date: Feb. 16, 2011 Registration date: Sep. 13, 2011.

"Spider Web LED Projection Bucket", by Shawshank Ledz, Published Online in [Dec. 2022] https://shawshankledz.com/images/P/768175-Hal%20SpiderWeb%20Projection%20LIT%20Bucket%20HiRes.jpg.

"Pumpkin Light Handle Halloween Buckets", by FlashingBlinkyLights, Found Online on [Sep. 8, 2023] https://www.flashingblinkylights.com/media/catalog/product/1/2/12328_halloween_pumpkin_buckets_frontv1_750.gif.

"Halloween candy bucket Light up Pail blow mold", by NINGBO, Published Online on [Sep. 9, 2020] https://m.media-amazon.com/images/I/81Du-n6IK9L._AC_SY741_.jpg.

"Halloween Pumpkin Bucket, Light Up Pumpkin Bucket", by TOYANDONA, Published Online on [Aug. 4, 2022] https://m.media-amazon.com/images/I/51nlt0lyR6L._AC_SX569_.jpg.

"Halloween Flash Light Up Orange Pumpkin Jack O Lantern Trick Or Treat Bucket", by Lamb's Collectibles, Found Online on [Sep. 8, 2023] https://i.ebayimg.com/images/g/pVOAAOSwHOJjMnmV/s-11600.webp.

"Led Light-up Halloween Bucket", by Rise, Found Online on [Sep. 8, 2023] https://s.alicdn.com/@sc04/kf/HTB1DiJzIOMnBKNjSZFCq6x0KFXah.jpg_960x960.jpg.

"Light Up Teal Pumpkin Halloween Felt Trick or Treat Bucket", by Six Senses Media, Found Online on [Sep. 8, 2023] https://m.media-amazon.com/images/I/61h5+rBHeCL__AC_SX679_.jpg.

"The Electric Mammoth Light Up Trick or Treat Halloween Pumpkin Bucket", by The Electric Mammoth, Published Online on [Aug. 22, 2019] https://m.media-amazon.com/images/I/511AbKLUFwL._AC_SX569_. jpg.

"Way to Celebrate Halloween Blue Light-Up Bucket Led Light Battery Operated", by Way to Celebrate, Found Online on [Sep. 8, 2023] https://i5.walmartimages.com/seo/Way-to-Celebrate-Halloween-Blue-Light-Up-Bucket-Led-Light-Battery-Operated_4edecfa1-0fcc-4d43-a259-f1808d0dfedb_1.1bfa3cd8d6c0ef0b229a4f20ec1ab96e.jpeg?odnHeight=2000&odnWidth=2000&odnBg=FFFFFF.

"Bulk 2Pcs Halloween Led Pumpkin Candy Bucket Trick or Treat Bucket Wholesale", Found Online on [Aug. 13, 2024] https://artificialmerch.com/cdn/shop/products/2_f61306ce-690d-4d40-b9bb-84e7ebd320a5_695x695.jpg?v=1661332215.

FOOD CARRIER THAT PROJECTS ONE OR MORE DECORATIVE SILHOUETTES AND ASSOCIATED METHODS OF MANUFACTURE

CLAIM OF PRIORITY

This Application is a Continuation-In-Part Application of, and claims priority to, co-pending U.S. patent application Ser. No. 18/230,108 titled "TREAT CARRIER THAT PROJECTS DECORATIVE SILHOUETTES" filed on Aug. 3, 2023, the contents of which are incorporated in entirety thereof in this application by reference.

FIELD OF TECHNOLOGY

This disclosure relates generally to the field of food carriers and methods of manufacture of the same, and more particularly to a food carrier in the form of a lighted bucket that projects one or more decorative silhouettes, and its associated methods of manufacture.

BACKGROUND

A holiday food carrier may be designed to carry and/or transport items such as candy, toys, and/or other gifts from neighbors. Candy may not be safe, and may create allergies when deposited into the bucket. As a result, the child may accidentally consume candies that are harmful to them.

In addition, Halloween night can be busy, with increased vehicle and foot traffic on a residential road. A child may be excited and therefore may not always pay attention to his/her surroundings. The child may not know a rule about road safety (e.g., such as looking both ways before crossing a residential street, using designated crosswalks, and staying on sidewalks).

The child's visibility on the residential street may be limited as caused by poor lighting. Insufficient or inadequate lighting on the residential street can make it difficult for the driver to see the child, especially during the darker evening hours of Halloween. Dimly lit areas, broken streetlights, and/or areas without streetlights altogether can create visibility challenges for both the driver and the child.

Moreover, keeping with a ghoulish theme of the Halloween holiday, the child may wear a costume and/or clothing that is dark in color. This can decrease visibility, and the child may blend into a surrounding, making it harder for the driver to spot the child. This is particularly problematic at Halloween night when there may be limited ambient light.

Obstructions such as parked cars, overgrown vegetation, and/or other obstacles near sidewalks can obstruct the view of the child, reducing visibility and increasing the risk of accidents with the driver. The child and the driver on the residential street may be distracted because of noises, people, costumes, and/or festivities during Halloween night. The driver may be distracted (eg, using their phone and/or engaged in other activities while behind the wheel). Therefore, the driver may not see the child.

For example, the driver may be traveling at a high speed on the residential street and may have reduced reaction time and may not have enough time to spot and avoid the child, particularly in poorly lit areas or when there are obstructions during Halloween. Adverse weather conditions during the late fall day of Halloween such as rain, fog, and/or snow can further reduce visibility for both the child and the driver, making it more challenging to see and be seen.

As groups of people participate in festivities and move about a neighborhood, a front yard and/or carnival in darkened conditions, the child may be subjected to numerous risks including trips and falls and traffic accidents. Walkways and crowded areas may be difficult for the child to see and perceive because of a lack of light and/or costuming that may be visually obstructive, leading to inadvertent tripping and/or other walking accidents. Likewise, walking along and/or crossing roadways may be dangerous because of lack of light and/or dark costuming that makes the child difficult to see to drivers, leading to avoidable traffic accidents and injury. It may be inconvenient and/or impractical for the child to simultaneously carry a flashlight and the bucket because of limited movement in the costume.

Therefore, the child may be hurt by the driver.

SUMMARY

Food carriers and methods of manufacture of the same are described, and more particularly to a food carrier in the form of a lighted bucket that projects one or more decorative silhouettes, and its associated methods of manufacture.

In one aspect, an apparatus includes a bucket formed of a translucent material in which a light source within the bucket illuminates the bucket interiorly and exteriorly. The translucent material of the bucket permits the light from the light source to pass through the bucket to a region exterior to the bucket. The apparatus includes at least one decorative opening along the surface of the exterior wall to permit the light to pass through to the region exterior to the bucket, which generates a decorative silhouette that emanates from the exterior wall of the bucket and projects to the region exterior to the bucket.

The apparatus may include a non-attached illuminator serving as the light source. The non-attached illuminator may be readily placed into the bucket and/or removed from the bucket by a user. The non-attached illuminator may be at least one of a glow stick, a LED light with its own power source, a battery-operated candle, and/or a rechargeable light module, each of which may be capable of providing sufficient illumination to enable the decorative silhouette to emanate from the exterior wall of the bucket and/or projects to the region exterior to the bucket.

The apparatus may further include a light-emitting diode affixed substantially on an interior portion of the bucket serving as the light source. The apparatus may include a battery that may provide an electrical current for the light-emitting diode. The apparatus may include a housing comprising a button, a battery, and/or the light-emitting diode. The battery may be stored in the housing. The light-emitting diode may be affixed within the housing. The housing may be at least partially translucent to allow light to pass through the bucket to the region exterior to the bucket. The button may control the battery's electrical output to the light-emitting diode. The light-emitting diode may have at least one of an OFF mode, a constant ON mode, and/or a flashing mode. The button may toggle the light-emitting diode between the OFF mode, the constant ON mode, and/or the flashing mode.

The apparatus may include a handle attached to a top region of a circular opening of the bucket. The apparatus may include a first projector on a housing bottom. The first projector may be at least partially embedded within the housing. The first projector may comprise a first lens. The first projector may be powered by the battery. Furthermore when powered by the battery, the first projector may emit a first decorative projection through the first lens to the region exterior to the bucket.

The apparatus may include a second projector on the housing bottom. The second projector may be at least partially embedded within the housing. The second projector may comprise a second lens. The second projector may be powered by the battery. Furthermore, when powered by the battery, the second projector may emit a second decorative projection through the second lens to the region exterior to the bucket. The first projector and/or the second projector may alternate between an off mode and/or an on mode which may provide a decorative projected effect to the region exterior to the bucket.

In another aspect, a food carrier comprises a bucket formed of a translucent material in which a light source within the bucket illuminates the bucket interiorly and exteriorly. The bucket is primarily formed through a single mold process in which the translucent material is manipulated in a form of the bucket. The food carrier includes at least one decorative opening along a surface of an exterior wall to permit the light to pass through to a region exterior to the bucket, and which generates a decorative silhouette that emanates from the exterior wall of the bucket and projects to areas surrounding the bucket. The food carrier includes an upper rim formed around a perimeter of a circular opening of the bucket.

The food carrier includes a housing comprising a button, a battery, and at least one light-emitting diode. The housing is attached to the bucket. The light-emitting diode serves as the light source and is affixed within the housing. The housing is at least partially is translucent to allow light from the light-emitting diode to pass through the bucket to the region exterior to the bucket. The food carrier includes a battery serving as the power source for the light-emitting diode, the battery being stored in the housing. The battery provides an electrical current for the light-emitting diode, and the button controls the battery's electrical output to the light-emitting diode.

The food carrier may include a first projector and/or a second projector embedded within the housing adjacent to the battery and/or the button. The first projector may comprise a first lens. The second projector may comprise a second lens. The first projector and/or the second projector may be powered by the battery. When powered by the battery, the first projector may emit a first decorative projection through the first lens to the region exterior to the bucket. Furthermore, when powered by the battery, the second projector may emit a first decorative projection through the second lens to the region exterior to the bucket.

The housing may be located at a center region of the bucket. The housing may be located at a side region of the bucket. The food carrier may include a handle attached to one of the bucket, a top region of the circular opening of the bucket, and/or the upper rim, via a revolute joint. The button may toggle the first projector and/or the second projector between an OFF mode, a constant ON mode, and/or a flashing mode.

In yet another aspect, a method of manufacturing a food carrier comprises forming a bucket through a single mold process in which a translucent material is manipulated in the form of the bucket. The translucent material is a material in which a light within the bucket illuminates the bucket interiorly and exteriorly. The method includes creating a at least one decorative opening along a surface of the exterior wall of the bucket during the molding process. The at least one decorative opening is designed to generate a decorative silhouette that emanates from the bucket and projects to the exterior of the bucket. The method includes attaching a handle to a top region of a circular opening of the bucket to facilitate carrying. The handle is attached to the bucket via a revolute joint.

The method includes constructing a housing that includes a button, a battery, and a light-emitting diode. The housing is at least partially translucent to allow light to pass through the housing to the bucket. The method includes placing the light-emitting diode within the housing. The method includes installing a battery in the housing to provide power to the light-emitting diode. The method includes connecting the button to the battery to control the electrical output from the battery to the light-emitting diode. The method includes attaching the housing to the bucket such that the light-emitting diode illuminates the bucket interiorly and exteriorly.

The method may further include embedding a first projector and/or a second projector within the housing bottom adjacent to the battery and/or the button. The first projector may comprise a first lens. The second projector may comprise a second lens. The first projector and/or the second projector may be powered by the battery. When powered by the battery, the first projector may emit a first decorative projection through the first lens to the region exterior to the bucket. Furthermore, when powered by the battery, the second projector may emit a first decorative projection through the second lens to the region exterior to the bucket. The first projector and/or the second projector may alternate between an off mode and/or an on mode which may provide a decorative projected effect automatically to the region exterior to the bucket.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION

Food carriers and methods of manufacture of the same are described, and more particularly to a food carrier that projects one or more decorative silhouettes and associated methods of manufacture.

Figure 1:
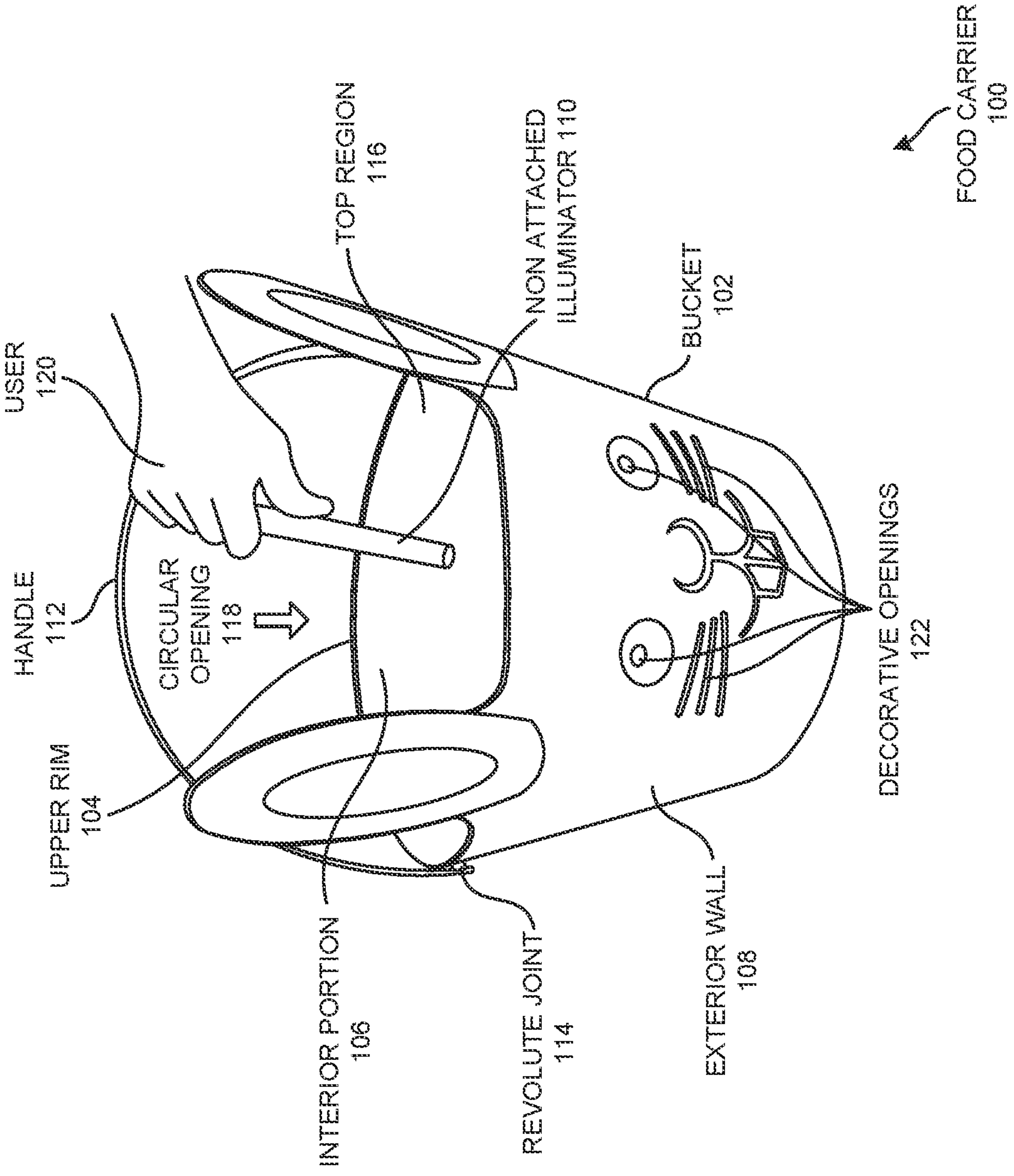
FIG. 1 is a side view of a food carrier in which a bucket comprising a non-attached illuminator is situated with a handle, according to one embodiment.

FIG. 1 is a side view of a food carrier 100 in which a bucket 102 comprising a non-attached illuminator 110 is situated with a handle 112, according to one embodiment. FIG. 1 illustrates the food carrier 100 comprising a bucket 102, an upper rim 104, an interior portion 106, an exterior wall 108, a non-attached illuminator 110, a handle 112, a revolute joint 114, a top region 116, a circular opening 118, a user 120, and decorative openings 122. The food carrier 100 may be used by children to carry treats, including but not limited to trick-or-treat candies during Halloween that are collected from neighbors and/or from homes in a neighborhood.

The bucket 102 may be a container crafted from a translucent material. The bucket 102 may be designed to hold various items while allowing light from an internal source to illuminate both an interior portion 106 and/or the exterior wall 108. The bucket 102 may be uniquely shaped to facilitate the projection of decorative patterns when lit from within. The bucket 102 may be formed from a single mold process and/or may be of a translucent material including but not limited to translucent, translucent Terephthalate (PET), Polypropylene (PP), Polycarbonate (PC), Polyvinyl Chloride (PVC), Silicone, Resins, translucent (PE), and/or Thermoplastic Polyurethane (TPU).

The upper rim 104 may be an integral part of the bucket 102. The upper rim 104 may be designed to facilitate easy handling and/or to secure the handle 112. The interior portion 106 may be formed in the single mold process and/or may comprise any portion of the inner area of the bucket 102 including but not limited to the upper rim 104, the top region 106, the side region 202 (not shown), the surface 204 (not shown), and/or the center region 206 (not shown). The interior portion 106 may be designed to accommodate the non-attached illuminator 110 and/or a built-in light source, including but not limited to a light-emitting diode. The interior portion 106 may have a smooth structure to ensure the safe storage of items within the bucket 102 and/or to reflect light efficiently. The interior portion 106 may also include a housing 302 (not shown) for securely holding the light source in place during use. The exterior wall 108 may be formed of the single mold process and/or may comprise any portion of the outer area of the bucket 102 The exterior wall 108 may be adorned with a series of at least one decorative opening (not shown) and/or patterns that not only enhance the aesthetic appeal of the bucket 102 but also may allow light to escape in a controlled manner which may create intricate shadows and/or patterns in the surrounding areas and/or the region exterior to the bucket.

The non-attached illuminator 110 may be a light source designed for easy insertion and/or removal from the bucket 102. The non-attached illuminator 110 may be a glow stick, an LED light with its own power source, a battery-operated candle, a rechargeable light module, and/or any portable light source that fits within the bucket 102. The non-attached illuminator 110 may be capable of providing illumination to enable a decorative silhouette to emanate from an exterior wall 108 of the bucket 102 and/or project to the region exterior to the bucket 102. The non-attached illuminator 110 may provide flexibility to change the light source as needed, whether for varying the light color, intensity, and/or to replace batteries.

The handle 112 may be formed of plastic, wire, metal, leather, and/or rope. The handle 112 may be attached to one of the bucket 102, the top region 116 of the circular opening 118 of the bucket 102, and/or the upper rim 104 via the revolute joint 114, which may allow the handle 112 to swivel in a rotational manner. The revolute joint 114 may be a hinge joint, a fixed revolute joint, a pin joint, a cylindrical joint, a swing arm joint, a spherical joint (e.g. a ball joint), a wrist joint, and/or a finger joint. The revolute joint 114 may be a pivotal connection that allows the handle 112 to move relative to the bucket 102. The revolute joint 114 may be engineered for smooth operation and/or durability which may ensure that the handle 112 may be rotated and/or folded without compromising the integrity of the bucket 102 and/or handle 112. The top region 116 may be formed in the single mold process and/or may comprise any of the top third of the bucket 102. The top region 116 may be the uppermost part of the bucket 102 which may surround the circular opening 118.

The top region 116 may be designed to reinforce the structure of the bucket 102 and/or to offer an edge around the circular opening 118 which may minimize the risk of damage to items being placed inside and/or taken out of the bucket 102. The circular opening 118 may be the top aperture through which the user 120 may place items and may be formed of different plastic materials. The circular opening 118 may be the access point through which items are placed into and/or removed from the bucket 102. The size of the circular opening 118 may be considered to accommodate a wide range of objects while maintaining the structural integrity of the bucket 102. The user 120 may be an individual who interacts with the bucket 102 for various purposes, including but not limited to carrying items, using it as a decorative light source, and/or as part of a functional storage solution.

The decorative openings 122 may be formed in the single mold process and/or may be many different types of holiday-themed orientations including moons, spiders, ghosts, ghouls, stars, bunnies, and/or religious insignia. The theme of the decorative opening 122 may be specifically associated with seasonal holidays, including but not limited to Halloween, Christmas, and/or Easter, and/or with licensed themes marketed toward seasonal holidays. The exterior wall 108 may be adorned with the least one decorative opening 122 and/or pattern that may not only enhance the aesthetic appeal of the bucket 102 but may also allow light to escape in a controlled manner which may create intricate shadows, decorative silhouettes, and/or patterns in the surrounding areas. The at least one decorative opening 122 may restrict passage of a food item to the outside of the bucket 102.

According to one embodiment, FIG. 1 discloses a bucket 102 that may be formed of a translucent material in which a light source within the bucket 102 may illuminate the bucket 102 both interiorly and/or exteriorly. The translucent material of the bucket 102 may permit the light from the light source to pass through to a region exterior to the bucket 102, which may generate a decorative silhouette that emanates from an exterior wall of the bucket 102 and/or projects to areas surrounding the bucket 102. Furthermore, the decorative openings 122 (e.g. at least one decorative opening) may be along the surface of the exterior wall 108 to permit the light to pass through to the region exterior to the bucket 102, which may generate a decorative silhouette that emanates from the exterior wall 108 of the bucket 102 and/or projects to the region exterior to the bucket 102.

A non-attached illuminator 110 may serve as the light source. The non-attached illuminator 110 may be readily placed into the bucket 102 and/or removed from the bucket 102 by the user 120. The non-attached illuminator 110 may be at least one of a glow stick, an LED light with its own power source, a battery-operated candle, and/or a rechargeable light module. Each of these non-attached illuminators 110 may be capable of providing sufficient illumination to enable a decorative silhouette to emanate from an exterior wall of the bucket 102 and/or project to the region exterior to the bucket 102.

Figure 2:
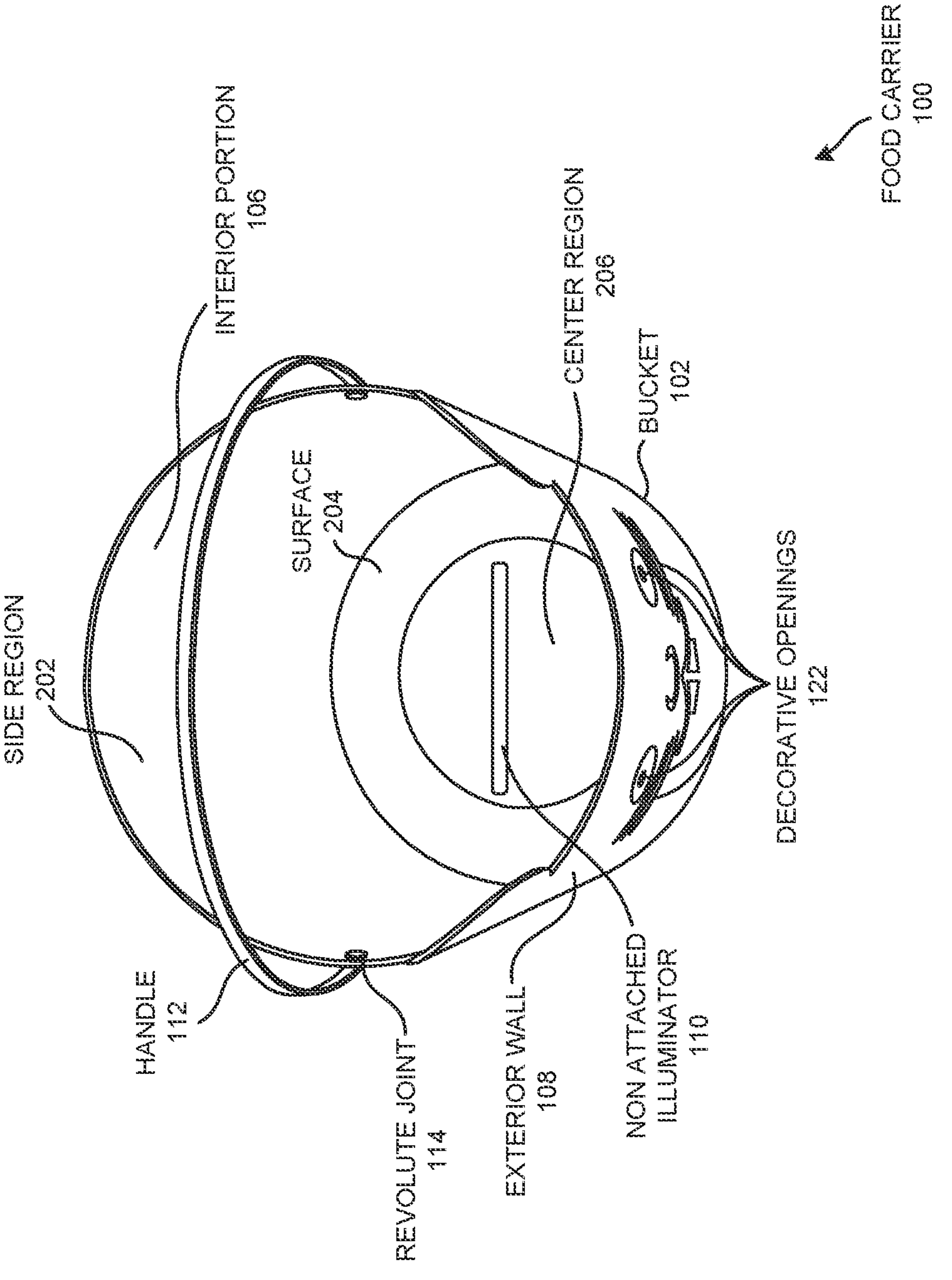
FIG. 2 is a top-down view of the food carrier of FIG. 1 wherein the food carrier comprises a non-attached illuminator at a center region of a surface of the bucket, according to one embodiment.

FIG. 2 is a top-down view of the food carrier 100 of FIG. 1 wherein the food carrier 100 comprises a non-attached illuminator 110 at a center region 206 of a surface 204 of the bucket 102, according to one embodiment. FIG. 2 illustrates the food carrier 100 comprising the bucket 102, the interior portion 106, the exterior wall 108, the non-attached illuminator 110, the handle 112, the revolute joint 114, the decorative openings 122, a side region 202, a surface 204, and a center region 206.

The side region 202 may be a subsection of the bucket 102 comprising the substantially vertically oriented surfaces 204 of the bucket 102. The side region 202 may be the interior side of the exterior wall 108. The side region 202 may be designed to support the structural integrity of the apparatus which may allow for maximum light transmission through the translucent material. The side region 202 may include a housing 302 (not shown) for a battery 404 (not shown), and/or a light-emitting diode 306 (not shown), each of which may be positioned in such a way as to optimize the balance of the apparatus and/or ensure ease of access for the battery 404 replacement. The side region 202 may also be configured to facilitate the attachment of additional components.

The surface 204 may be the lowest portion of the interior portion 106 of the bucket 102. The surface 204 may be crafted from the translucent material and/or may act as a base for the bucket 102. The surface 204 may also include a designated area and/or support structure for securely positioning the non-attached illuminator 110, the housing 302 (not shown), and/or the light-emitting diode 306 (not shown). The center region 206 may be a subsection of the surface 204 and/or may be a location within the bucket 102 where the non-attached illuminator 110 and/or the housing 302 (not shown) for the light source may be strategically positioned. The center region 206 may be designed to ensure even distribution of weight, facilitate ease of access for maintenance and/or replacement of parts, and/or may enhance the overall aesthetic appeal of the device. The center region 206 may ensure uniform distribution of light and/or other emitted elements from the bucket 102.

Figure 3:
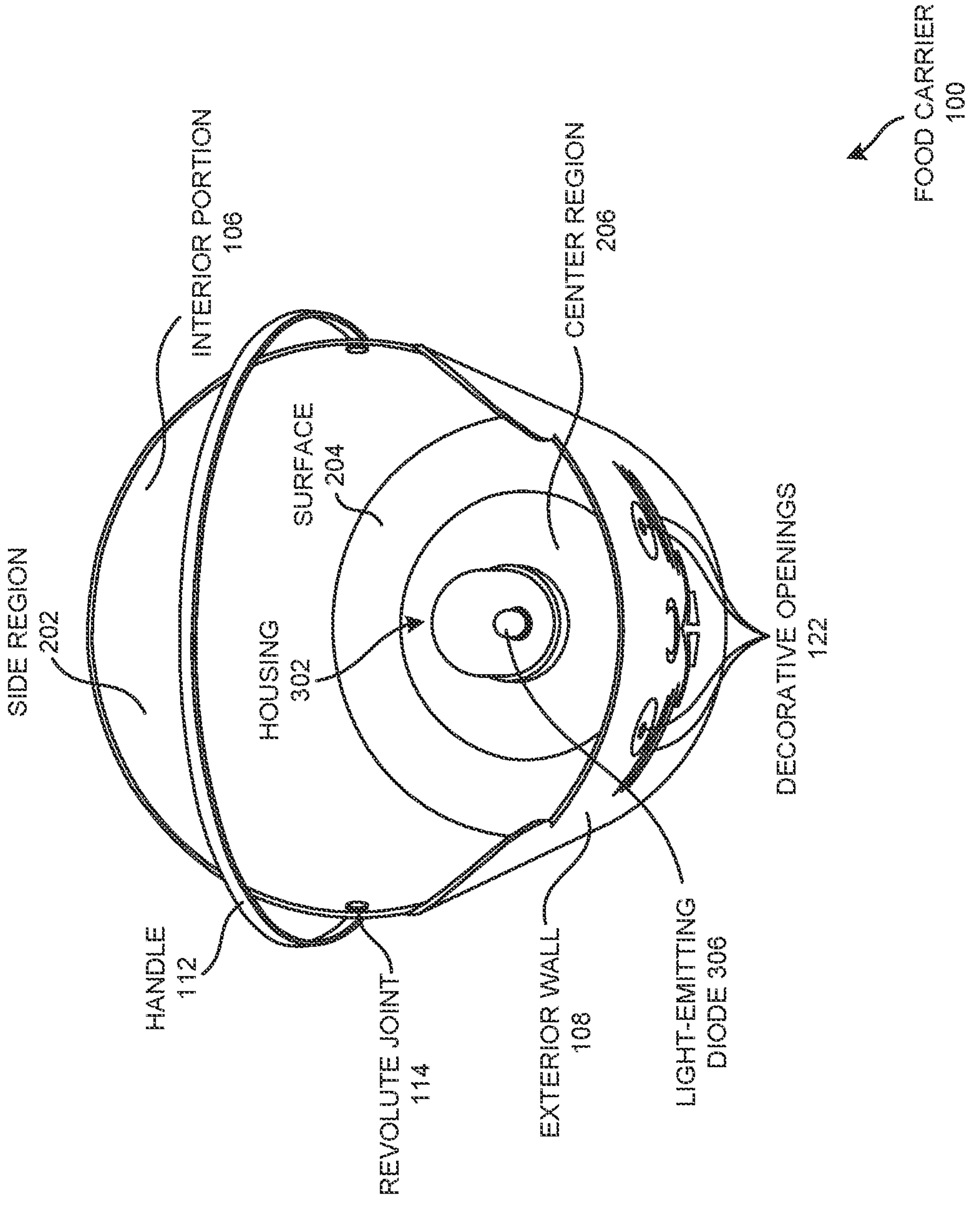
FIG. 3 is an alternative embodiment of the food carrier of FIGS. 1-2 wherein the bucket comprises a housing comprising a light-emitting diode attached adjacent to the center region of the surface of the food carrier, according to one embodiment.

FIG. 3 is an alternative embodiment of the food carrier 100 of FIGS. 1-2 wherein the bucket 102 comprises a housing 302 comprising a light-emitting diode 306 attached adjacent to the center region 206 of the surface 204 of the food carrier 100, according to one embodiment. FIG. 3 illustrates the food carrier 100 comprising the bucket 102, the interior portion 106, the exterior wall 108, the handle 112, the revolute joint 114, the decorative openings 122, the side region 202, the surface 204, the center region 206, a housing 302, and a light-emitting diode 306.

The housing 302 may be an enclosure within the center region 206 of the surface 204. The housing 302 may comprise the light-emitting diode 306, the battery 404 (not shown), and/or control mechanisms including but not limited to a button 408 (not shown) for operating the light-emitting diode 306. The housing 302 may be manufactured from materials that are durable yet lightweight, including but not limited to high-grade plastic and/or metal to protect the internal components from physical damage and/or environmental factors. The housing 302 may be shaped to facilitate easy access and/or operation by the user 120, with features including but not limited to a snap-fit and/or screw-on lid for battery 404 replacement. The center region 206 may include components including but not limited to the housing 302 (not shown) for the light source and/or control mechanism. The center region 206 may be designed to maximize space utilization and/or promote the efficient operation of the device.

The housing 302 may act as a refraction means for the light-emitting diode 306 to bend the light from the light-emitting diode 306. The housing 302 may be at least partially constructed from transparent material including but not limited to acrylic, plastic, and/or tempered glass. The housing 302 may allow light to pass through the bucket 102 while protecting the light-emitting diode 306 from physical contact and/or environmental damage. The housing 302 may be designed to optimize light diffusion and/or distribution throughout the bucket 102. The housing 302 may incorporate features including but not limited to a frosted finish and/or integrated lenses to create desired lighting effects and/or patterns. Additionally, the housing 302 may include a mechanism for adjusting the focus and/or direction of the light which may enable users 120 to customize the lighting effect according to their preferences.

The light-emitting diode 306 may be a high-efficiency, low-power consumption component capable of producing bright, vivid light in various colors and/or color temperatures. The light-emitting diode 306 may be affixed in an interior portion of the bucket 102 and/or may serve as the light source. The light-emitting diode 306 may be programmable which may allow it to display a range of lighting modes including but not limited to OFF mode, constant ON mode, flashing mode, and/or color-changing mode, which may be controlled via a button 408 (not shown) integrated into the housing 302. Additionally, the light-emitting diode 306 may be optimized for uniform light distribution which may ensure that the light is evenly dispersed through the at least one decorative opening and/or the translucent material of the bucket 102. The light-emitting diode 306 may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs.

According to one embodiment, FIG. 3 discloses the light-emitting diode 306 which may serve as the light source. The bucket 102 may comprise the housing 302 which may comprise a button 408 (not shown), a battery 404, and/or the light-emitting diode 306. The battery 404 (not shown) may provide an electrical current for the light-emitting diode 306. The battery 404 may be stored in the housing 302. The light-emitting diode 306 may be affixed in an interior portion 106 of the bucket 102. The light-emitting diode 306 may be affixed within the housing 302. The housing 302 may be at least partially translucent which may allow light to pass through the bucket 102 to an area exterior of the bucket 102. The button 408 (not shown) may control the electrical output of the battery 404 to the light-emitting diode 306.

Figure 4:
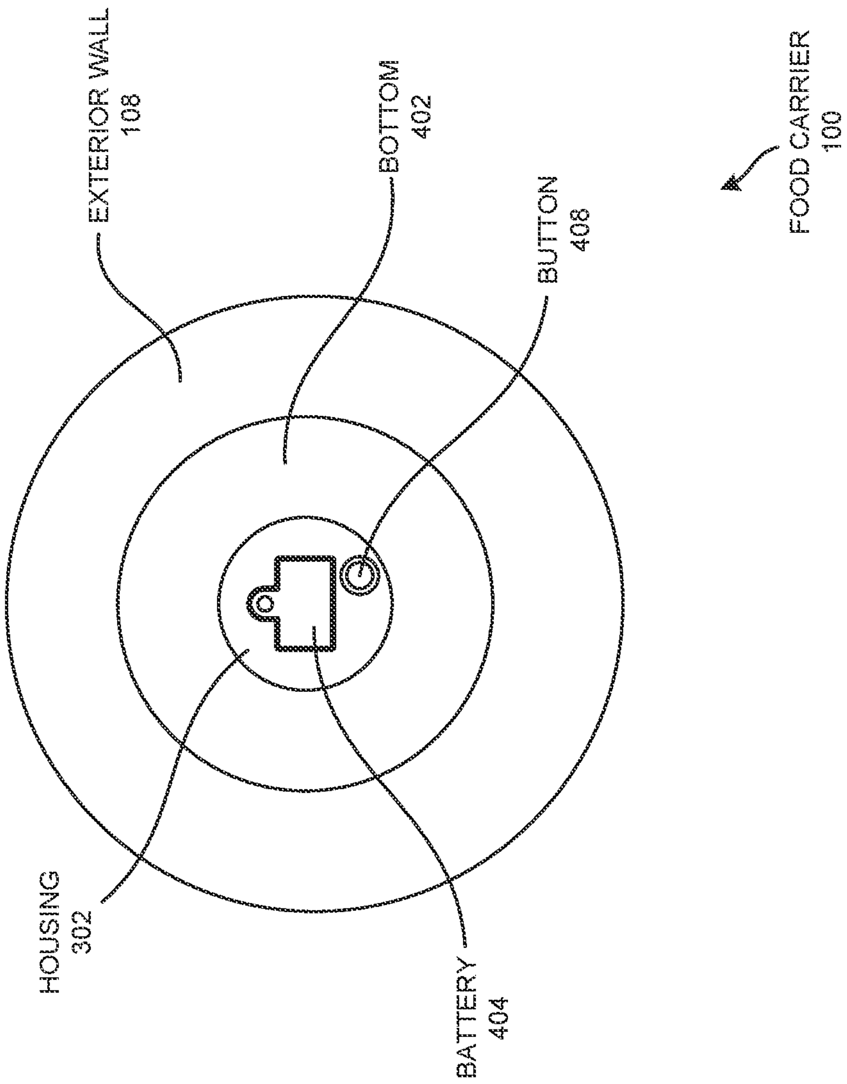
FIG. 4 is an upside-down side view of the underside components of the food carrier of FIG. 3, according to one embodiment.

FIG. 4 is an upside-down side view of the underside components of the food carrier 100 of FIG. 3, according to one embodiment. FIG. 4 illustrates the food carrier 100 comprising the exterior wall 108, the housing 302, a bottom 402, a battery 404, and a button 408. The bottom 402 may be an exterior of the surface 204 that acts as a base for the bucket 102. The bottom 402 may allow the bucket 102 to stand upright and/or hold the contents inside from falling out. The bottom 402 may be constructed from the translucent material and may be suitable for supporting the weight and/or contents of the bucket 102. The bottom 402 may also feature a textured and/or non-slip surface to enhance stability when placed on various surfaces.

The battery 404 may be a power-source component including but not limited to lithium-ion and/or nickel-metal hydride. The battery 404 may provide a power output suitable for powering the light-emitting diode 306 over extended periods. The battery 404 may be designed for easy replacement and/or removal which may facilitate recycling and/or disposal. The button 408 may be a switch to control the function of the LED 306. The button 408 may be a push-button switch, a slide switch, a toggle switch, a rocker switch, a dual in-line package switch, a tactile switch, a capacitive touch sensor, a proximity sensor, a rotary switch, and/or a soft power button.

The button 408 may be designed to control the electrical output from the battery 404 to the light-emitting diode 306. The button 408 may enable the user 120 to switch the light-emitting diode 306 between multiple modes, including but not limited to an OFF mode, a constant ON mode, and/or a flashing mode. The button 408 may be positioned for easy access by the user 120 to control the functions of the bucket 102. The button 408 may be constructed from a durable material that withstands repeated use and/or offers a tactile response to confirm activation. The button 408 may serve other functions including but not limited to turning the LED 306 ON and/or OFF, toggling between different lighting modes (e.g., constant, flashing), and/or adjusting the light intensity. Additionally, the button 408 may be waterproof and/or dustproof to ensure reliable operation in various environments.

According to one embodiment, FIG. 4 discloses the housing 302 which may be affixed to the bottom 402 of the bucket 102. The housing 302 may be located at the center region 206 of the bucket 102. Furthermore, the housing 302 may be located at the center region 206 of the surface 204 of the interior portion 106 bucket 102. The housing 302 may comprise the battery 404, the button 408, and/or at least one light-emitting diode 306. The battery 404 may be housed and/or stored within the housing 302.

The battery 404 may provide the necessary power to the light-emitting diode 306 and/or other light sources associated within the bucket 102. The button 408 may be integrated into the housing 302 which may be accessible on the exterior of housing 302. The button 408 may be connected to the battery 404 and/or the light-emitting diode 306 to allow the user 120 to control functions of the bucket 102.

Figure 5:
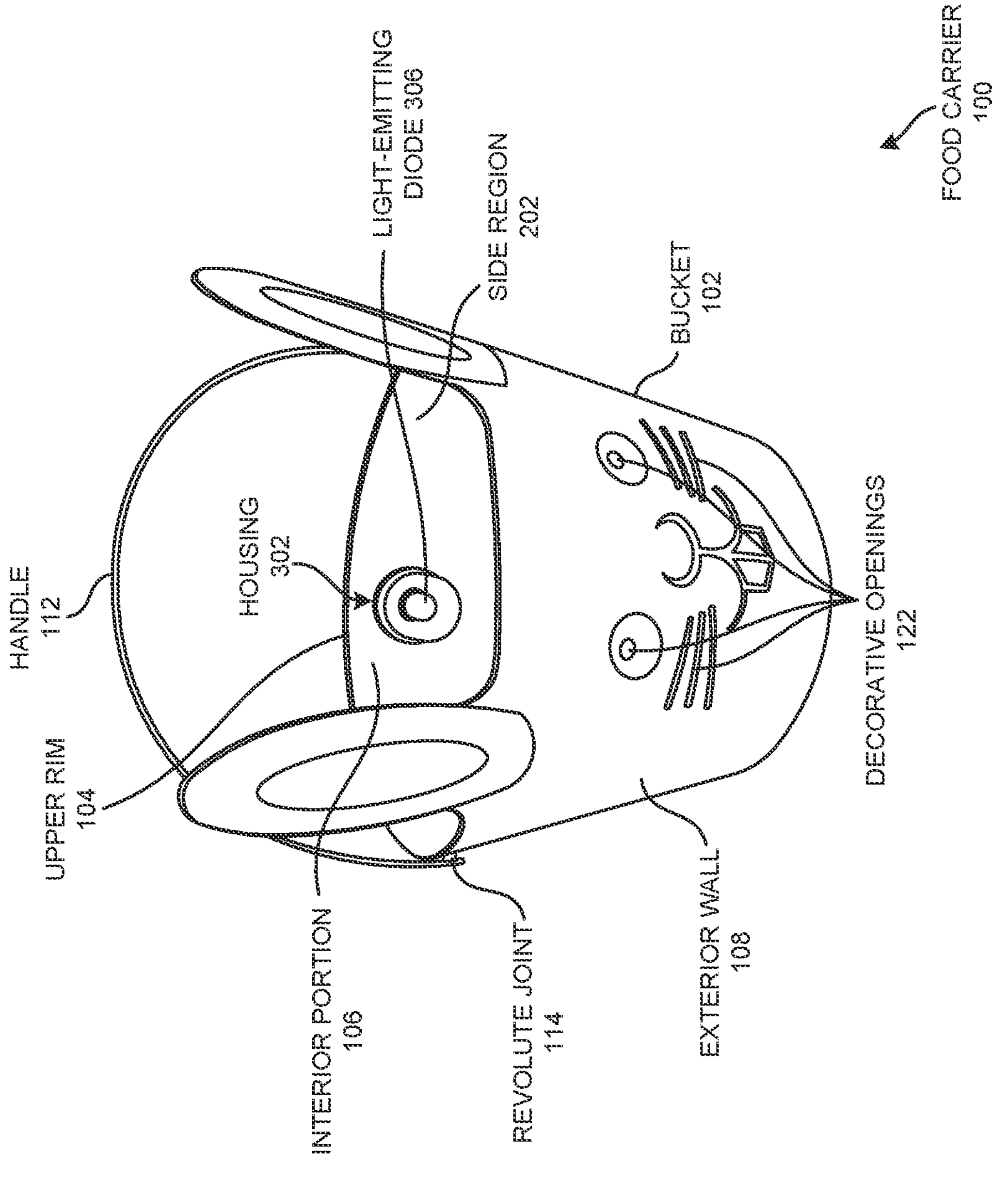
FIG. 5 is an alternative embodiment of the food carrier of FIGS. 1-4 wherein the housing and its various components are attached to the side region of the bucket, according to one embodiment.

FIG. 5 is an alternative embodiment of the food carrier 100 of FIGS. 1-4 wherein the housing 302 and its various components are attached to the side region 202 of the bucket 102, according to one embodiment. FIG. 5 illustrates the food carrier 100 comprising the bucket 102, the upper rim 104, the interior portion 106, the exterior wall 108, the handle 112, the revolute joint 114, the decorative openings 122, the side region 202, the housing 302, and the light-emitting diode 306. According to one embodiment illustrated in FIG. 5, the housing 302 may be positioned on the side region 202 of the interior portion 106 of the bucket 102 such that the light-emitting diode 306 faces the interior portion 106 of the bucket 102. This placement of the housing 302 may be designed to accommodate various components within the housing 302, including but not limited to battery 304, the light-emitting diode 306, a button 408, a battery compartment (not shown), a first projector (not shown), an/or a second projector (not shown).

By affixing the housing 302 to the side region 202 of the interior portion 106 may brighten the interior portion 106 and/or radiates outward to the surrounding exterior area of the bucket 102. Positioning the housing 302 on the side region 202 may allow for a balanced distribution of light which may enhance the decorative silhouettes projected by the bucket 102. Placing the housing 302 on the side region 202 may allow user 120 to easily access the button 408 (not shown) for maintenance and/or adjustments without needing to disturb the contents of the bucket 102.

This placement of the housing 302 in the bucket 102 may ensure that changing the battery 404 and/or toggling the light-emitting diode 306 lighting modes may be done quickly and/or conveniently. Attaching the housing 302 to the side region 202 may contribute to the overall durability and/or stability of the bucket 102. Placing the housing 302 on the side region 202 may minimize the risk of damage to the electronic components during use, as the side region 202 is less likely to encounter direct impacts compared to the bottom 402 and/or the upper rim 104 of the bucket 102.

Figure 6:
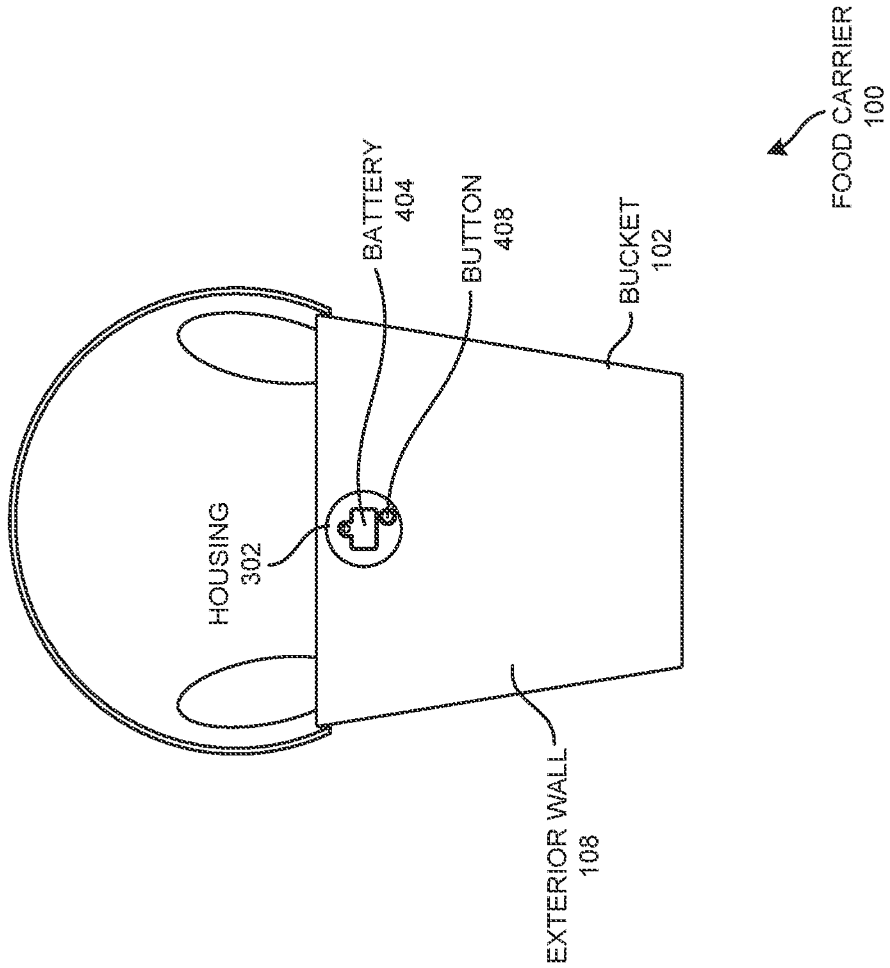
FIG. 6 is a side view of the exterior wall of the bucket of FIG. 5 wherein the housing and its various components are attached to the side region of the bucket, according to one embodiment.

FIG. 6 is a side view of the exterior wall 108 of the bucket 102 of FIG. 5 wherein the housing 302 and its various components are attached to the side region 202 of the bucket 102, according to one embodiment. FIG. 6 illustrates the food carrier 100 comprising the bucket 102, the exterior wall 108, the housing 302, the battery 404, and the button 408. According to one embodiment illustrated in FIG. 6, the housing 302, the battery 404, and/or the button 408 may be located at least on the exterior wall 108 opposite of the side region 202 of the bucket 102. The housing 302 may be designed to integrate with exterior wall 108 of the bucket 102 which may provide a compact and/or efficient solution for the housing 302 with the electrical components necessary for illumination.

The housing 302 may be positioned on the exterior wall 108 of the bucket 102 to ensure ease of access for the user 120. The housing 302 may be attached to the exterior wall 108 of the bucket 102 through a combination of mechanical fastenings and/or precision-engineered alignment features. This positioning of the housing 302 may include snap-fit connections, screws, and/or brackets that ensure attachment without compromising the aesthetic appeal of the bucket 102. The housing 302 may accommodate the battery 404 and/or the button 408 in such a way that they are protected from environmental elements while remaining easily accessible for battery 404 replacement and/or function control. The exterior placement of the housing 302 may be optimized to enhance the functionality of the bucket 102 and/or user 120 experience which may ensure that the light source is effectively powered and/or controlled with minimal effort.

Figure 7:
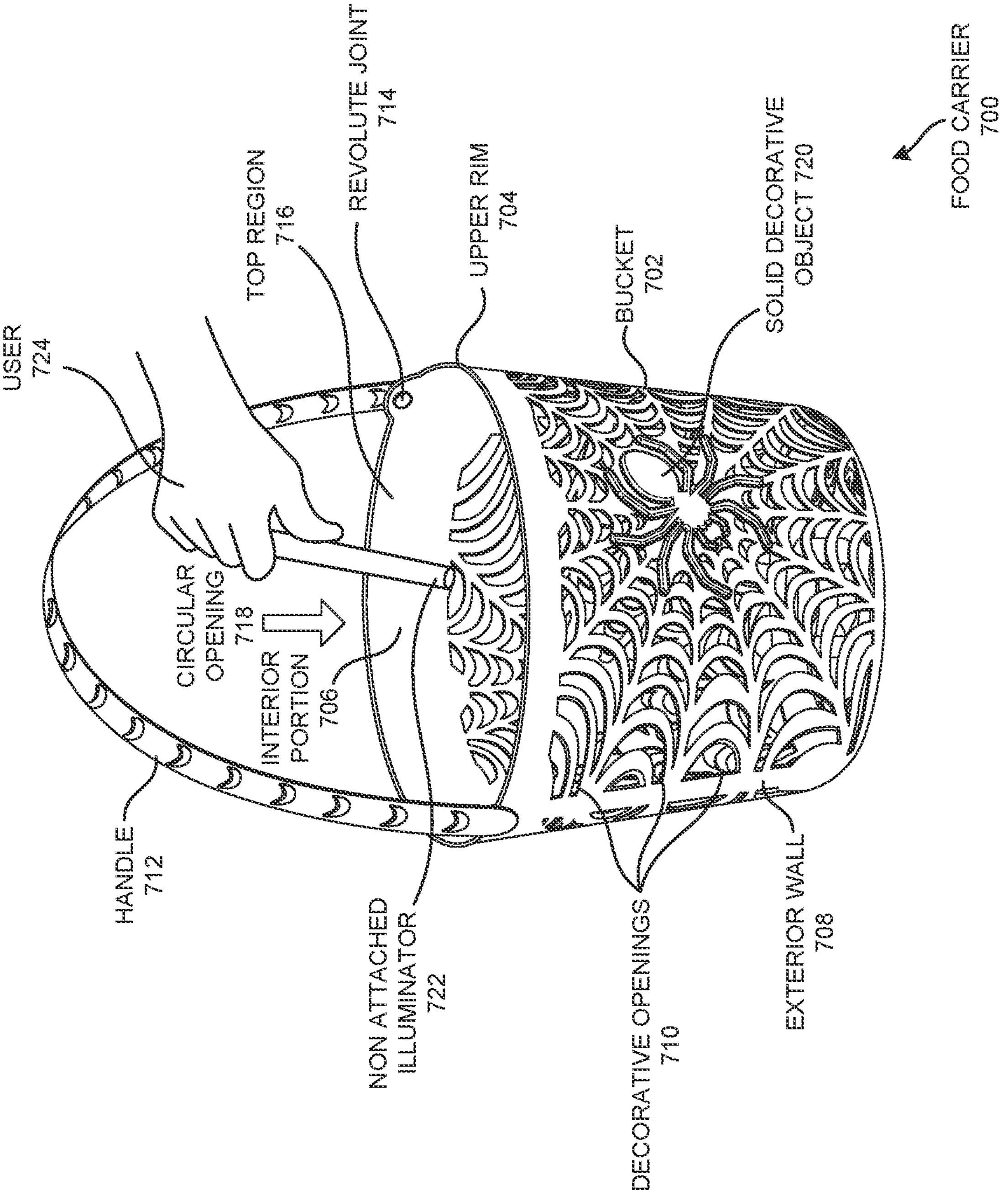
FIG. 7 is an alternative embodiment of the food carrier of FIGS. 1-6 wherein the bucket comprises at least one decorative opening and the bucket is situated with a handle, according to one embodiment.

FIG. 7 is an alternative embodiment of the food carrier 700 of FIGS. 1-6 wherein the bucket 702 comprises at least one decorative opening 710 and the bucket 102 is situated with a handle 712, according to one embodiment. FIG. 7 illustrates an alternative embodiment of food carrier 700 of FIGS. 1-6 wherein the food carrier 700 comprises a bucket 702, an upper rim 704, an interior portion 706, an exterior wall 708, at least one decorative opening 710, a handle 712, a revolute joint 714, a top region 716, a circular opening 718, a solid decorative object 720, a non-attached illuminator 722, and a user 724.

The food carrier 700 may be used by children to carry treats, including but not limited to trick-or-treat candies during Halloween that are collected from neighbors and/or from homes in a neighborhood. The bucket 702 may be formed from a single mold process of a translucent material including but not limited to translucent, translucent Terephthalate (PET), Polypropylene (PP), Polycarbonate (PC), Polyvinyl Chloride (PVC), Silicone, Resins, translucent (PE), and/or Thermoplastic Polyurethane (TPU). The upper rim 704 may be an integral part of the bucket 702. The upper rim 704 may be designed to facilitate easy handling and/or to secure the handle 712.

The interior portion 706 may be formed in the single mold process and/or may comprise any portion of the inner area of the bucket 702 including but not limited to the upper rim 704, the top region 706, the side region 802 (not shown), the surface 804 (not shown) and/or the center region 806 (not shown). The interior portion 706 may be designed to accommodate the non-attached illuminator 710 and/or a built-in light source, including but not limited to an LED. The interior portion 706 may have a smooth structure to ensure the safe storage of items within the bucket 702 and/or to reflect light efficiently. The interior portion 706 may also include a housing 902 (not shown) for securely holding the light source in place during use.

The exterior wall 708 may be formed of the single mold process and/or may comprise any portion of the outer area of the bucket 702. The exterior wall 708 may be adorned with at least one decorative opening 710 and/or pattern that may not only enhance the aesthetic appeal of the bucket 702 but may also allow light to escape in a controlled manner which may create intricate shadows, decorative silhouettes, and/or patterns in the surrounding areas. The at least one decorative opening 710 may restrict passage of a food item to the outside of the bucket 702.

The at least one decorative opening 710 may be formed in the single mold process and may be many different types of holiday-themed orientations including moons, spiders, ghosts, ghouls, stars, bunnies, and/or religious insignia. The theme of the decorative opening 710 may be specifically associated with seasonal holidays including but not limited to Halloween, Christmas, and/or Easter, and/or with licensed themes marketed toward seasonal holidays. The handle 712 may be formed of plastic, wire, metal, leather, and/or rope. The handle 712 may be attached to one of the bucket 702, the top region 716 of the circular opening 718 of the bucket 702, and/or the upper rim 704 via the revolute joint 714, which may allow the handle 712 to swivel in a rotational manner.

The revolute joint 714 may be a hinge joint, a fixed revolute joint, a pin joint, a cylindrical joint, a swing arm joint, a spherical joint (e.g. a ball joint), a wrist joint, and/or a finger joint. The revolute joint 714 may be a pivotal connection that allows the handle 712 to move relative to the bucket 702. The revolute joint 714 may be engineered for smooth operation and/or durability which may ensure that the handle 712 may be rotated and/or folded without compromising the integrity of the bucket 702 and/or handle 712.

The top region 716 may be formed in the single mold process and/or may comprise any of the top third of the bucket 702. The top region 716 may be the uppermost part of the bucket 702 which may surround the circular opening 718. The top region 716 may be designed to reinforce the structure of the bucket 702 and/or to offer an edge around the circular opening 718 which may minimize the risk of damage to items being placed inside and/or taken out of the bucket 702.

The circular opening 718 may be the top aperture through which users place items and/or may be formed of different plastic materials. The circular opening 718 may be the access point through which items are placed into and/or removed from the bucket 702. The size of the circular opening 718 may be considered to accommodate a wide range of objects while maintaining the structural integrity of the bucket 702. The solid decorative object 720 may be formed in the single mold process and/or added to the bucket 702 via a screw, adhesive, and/or melt bonding. The non-attached illuminator 722 may be a versatile light source designed for easy insertion and/or removal from the bucket 702. The non-attached illuminator 722 may be an LED light, a small flashlight, and/or any portable light source that fits within the bucket 702. The non-attached illuminator 722 may be intended to provide the user 724 with the flexibility to change the light source as needed, whether for varying the light color, intensity, and/or to replace batteries. The user 724 may be an individual who interacts with the bucket 702 for various purposes, including but not limited to carrying items, using it as a decorative light source, and/or as part of a functional storage solution.

According to one or more embodiments, the food carrier 700 may comprise the bucket 702 which may be formed of a translucent material in which a light source within the bucket 702 illuminates the bucket 702 interiorly and/or exteriorly. The light may be visible through the exterior wall 708 of the bucket 702. The bucket 702 may be primarily formed through a single mold process in which a translucent material is manipulated in a form of the bucket 702. The handle 712 may be attached to one of the bucket 702, the top region 716 of the circular opening 718 of the bucket 702, and/or the upper rim 704 via a revolute joint 714, which may allow the handle 712 to swivel in a rotational manner.

The at least one decorative opening 710 may be formed during the single mold process in which the translucent material is manipulated in the form of the bucket 702. The at least one decorative opening 710 may restrict the passage items to the outside of the bucket 702. The at least one decorative opening 710 may permit the light to pass through to a region exterior to the bucket 702 which may create at least one decorative silhouette and/or may transform the light into a kaleidoscopic pattern around a person carrying the bucket 702. The bucket 702 may further comprise a solid decorative object 720 that may be transposed on the exterior wall 708 of the bucket 702 in which may block the light from passing through the solid decorative object 720.

Figure 8:
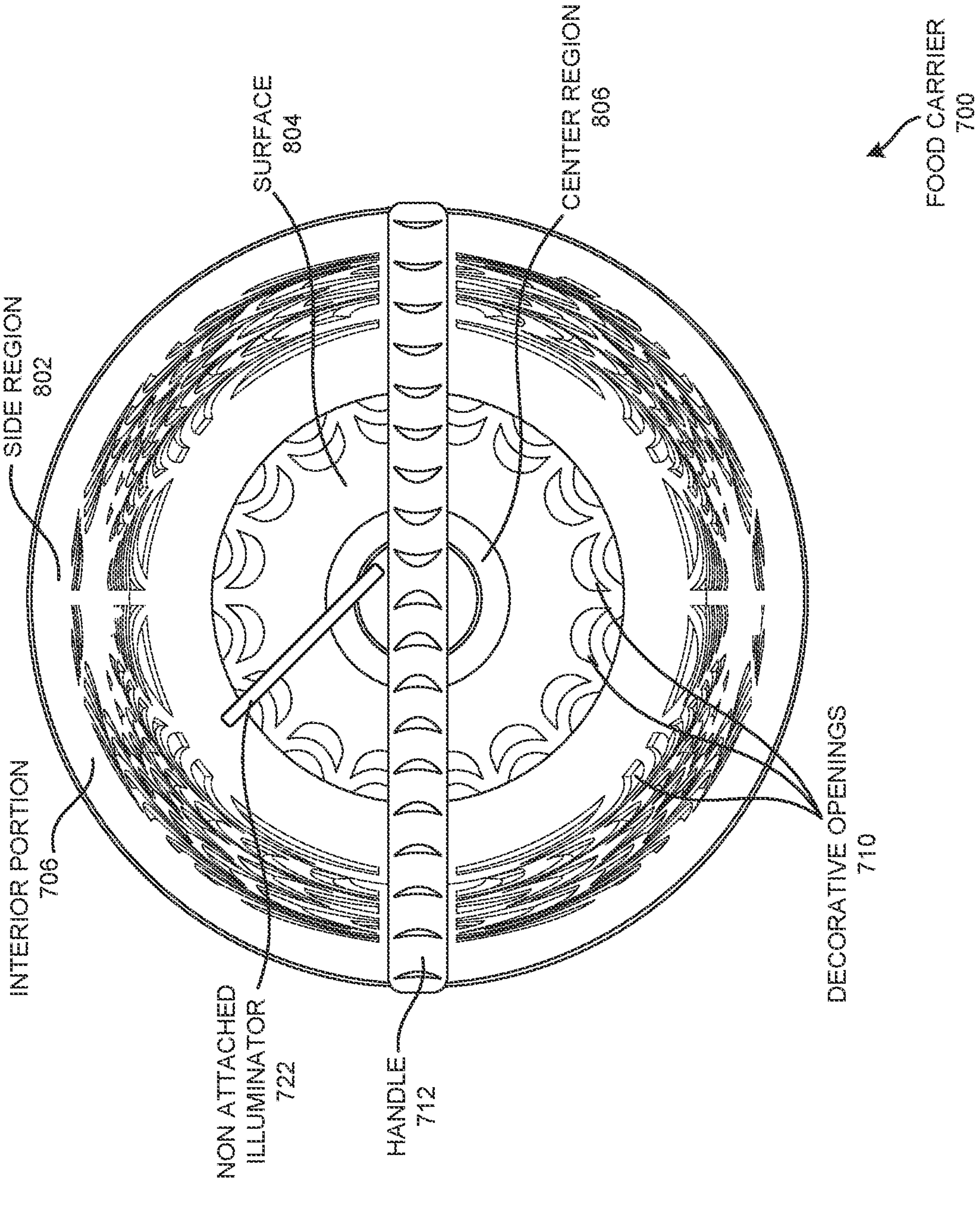
FIG. 8 is a top-down view of the food carrier of FIG. 7 wherein a non-attached illuminator is placed adjacent to a center region of the surface of the food carrier, according to one embodiment.

FIG. 8 is a top-down view of the food carrier 700 of FIG. 7 wherein a non-attached illuminator 712 is placed adjacent to a center region 806 of the surface 804 of the food carrier 700, according to one embodiment. FIG. 8 illustrates the food carrier 700 comprising the interior portion 706, the at least one decorative opening 710, the handle 712, the non-attached illuminator 722, a side region 802, a surface 804, and a center region 806.

The side region 802 may be a subsection of the bucket 702 comprising the substantially vertically oriented surfaces 804 of the bucket 702. The side region 802 may be the interior side of the exterior wall 708. The side region 802 may be designed to support the structural integrity of the apparatus which may allow for maximum light transmission through the translucent material. The side region 802 may include a housing 902 (not shown) comprising various components including but not limited to a button 1008 (not shown), a battery 1004 (not shown), and/or a light-emitting diode 906 (not shown), each of which may be positioned in such a way as to optimize the balance of the apparatus and/or ensure ease of access for the battery 1004 replacement. The side region 802 may also be configured to facilitate the attachment of additional components.

The surface 804 may be the lowest portion of the interior portion 706 of the bucket 702. The surface 804 may be crafted from the translucent material which may act as a base of the bucket 702. The surface 804 may also include a designated area and/or support structure for securely positioning the non-attached illuminator 722 and/or the housing 902 (not shown).

According to one embodiment, the bucket 702 may comprise the center region 806. The center region 806 may be a subsection of the surface 804 and/or may be the primary location within the bucket 702 where the housing 902 (not shown) for the lighting mechanism may be strategically positioned. The center region 806 may be designed to ensure even distribution of weight, facilitate ease of access for maintenance and/or replacement of parts, and/or enhance the overall aesthetic appeal of the device. The center region 806 may ensure uniform distribution of light and/or other emitted elements from the bucket 702. As further shown in FIG. 8, the non-attached illuminator may be placed within the bucket 702 and/or may rest upon the surface 804.

Figure 9:
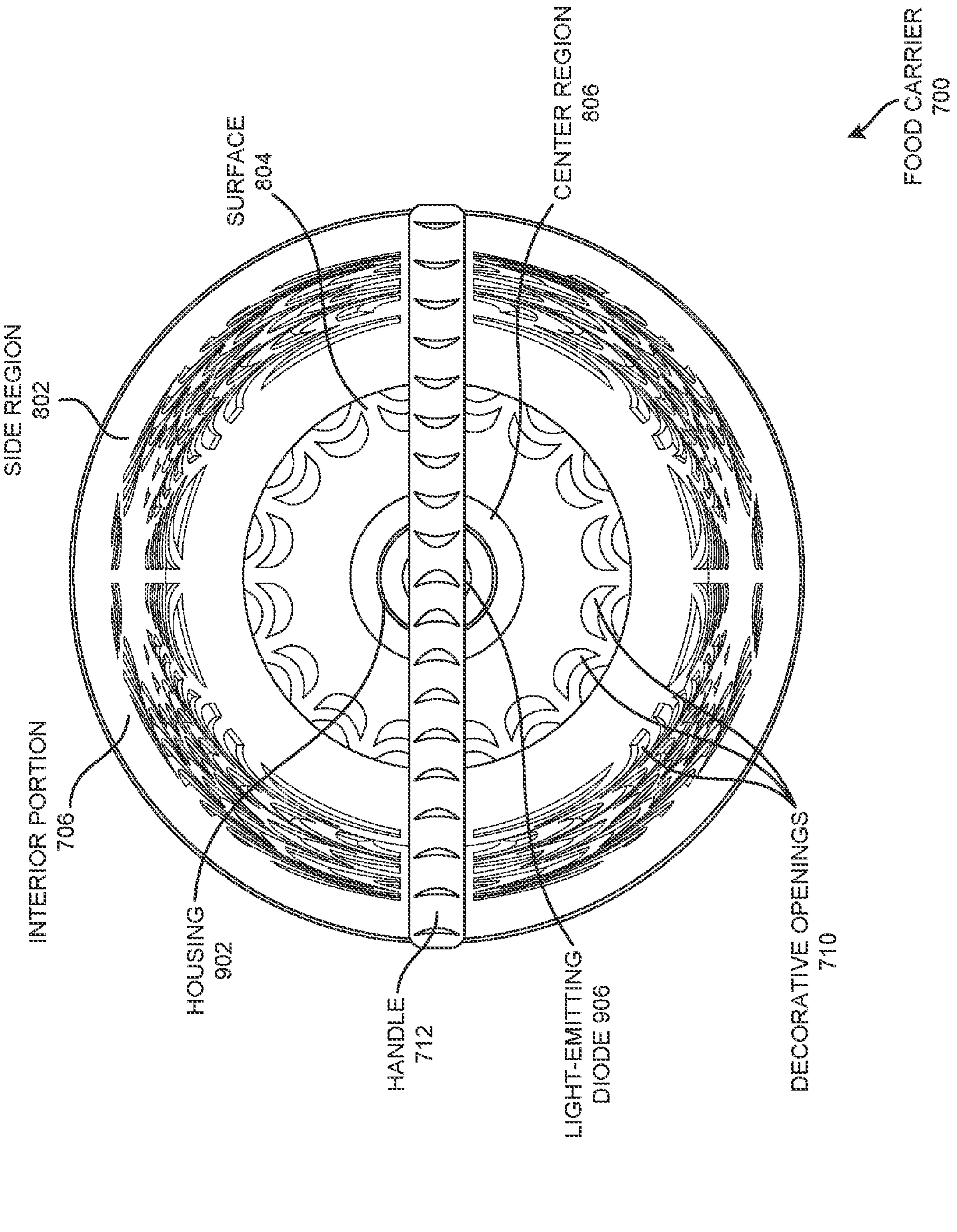
FIG. 9 is an alternative embodiment of the food carrier of FIGS. 1-8 wherein the bucket comprises a housing comprising a light-emitting diode, according to one embodiment.

FIG. 9 is an alternative embodiment of the food carrier 700 of FIGS. 1-8 wherein the bucket 702 comprises a housing 902 comprising a light-emitting diode 906, according to one embodiment. FIG. 9 illustrates the food carrier 700 comprising the interior portion 706, the at least one decorative opening 710, the handle 712, the side region 802, the surface 804, the center region 806, a housing 902, and a light-emitting diode 906.

The housing 902 may be an enclosure within the center region 806 of the surface 804. The housing 902 may securely comprise the light-emitting diode 906, the battery 1004 (not shown), and/or control mechanisms including but not limited to a button 1008 (not shown) for operating the light-emitting diode 906. The housing 902 may be manufactured from materials that are durable yet lightweight, including but not limited to high-grade plastic and/or metal, to protect the internal components from physical damage and/or environmental factors. The housing 902 may be shaped to facilitate easy access and/or operation by the user 724, including features but not limited to a snap-fit and/or screw-on lid for battery 1004 replacement. The center region 806 may include components including but not limited to the housing 902 (not shown) for the light source and/or control mechanism. The center region 806 may be designed to maximize space utilization and/or promote the efficient operation of the device.

The housing 902 may act as a refraction means for the light-emitting diode 906 to bend the light from the light-emitting diode 906. The housing 902 may be constructed at least partially from transparent material, including but not limited to acrylic and/or tempered glass. The housing 902 may allow light to pass through the bucket 702 while protecting the light-emitting diode 906 from physical contact and/or environmental damage. The housing 902 may be designed to optimize light diffusion and/or distribution and/or may incorporate features including but not limited to a frosted finish and/or integrated lenses to create desired lighting effects and/or patterns. Additionally, the housing 902 may include a mechanism for adjusting the focus and/or direction of the light which may enable users to customize the lighting effect according to their preferences.

The light-emitting diode 906 may be a high-efficiency, low-power consumption component capable of producing bright, vivid light in various colors and/or color temperatures, depending on the desired aesthetic effect. The light-emitting diode 906 may be affixed substantially on an interior portion of the bucket 702 and/or may serve as the light source. The light-emitting diode 906 may be programmable which may allow the light-emitting diode 906 to display a range of lighting modes, including but not limited to OFF mode, constant ON mode, flashing mode, and/or color-changing mode, which may be controlled via the button 1008 (not shown) integrated into the housing 902.

Additionally, the light-emitting diode 906 may be optimized for uniform light distribution which may ensure that the light is evenly dispersed through the at least one decorative opening 710 and/or the translucent material of the bucket 702. The light-emitting diode 906 may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs.

According to one embodiment, FIG. 9 illustrates the bucket 702 which may comprise the at least one decorative opening 710 along the surface 804 of the exterior wall 708. The at least one decorative opening 710 may permit the light to pass through to a region and/or areas exterior to the bucket 702. The at least one decorative opening 710 may generate a decorative silhouette that emanates from the exterior wall 708 of the bucket 702 and projects to areas surrounding the bucket 102.

The food carrier 700 may include the light-emitting diode 906 affixed in the housing 902 in the center region 806 of the surface 804 of the interior portion 706 of the bucket 702. The light-emitting diode 906 may serve as the light source. Although the light-emitting diode 906 is shown placed in housing 902 in the center region 806, the housing 902 and/or its various subcomponents may be placed anywhere within the bucket 702.

Figure 10:
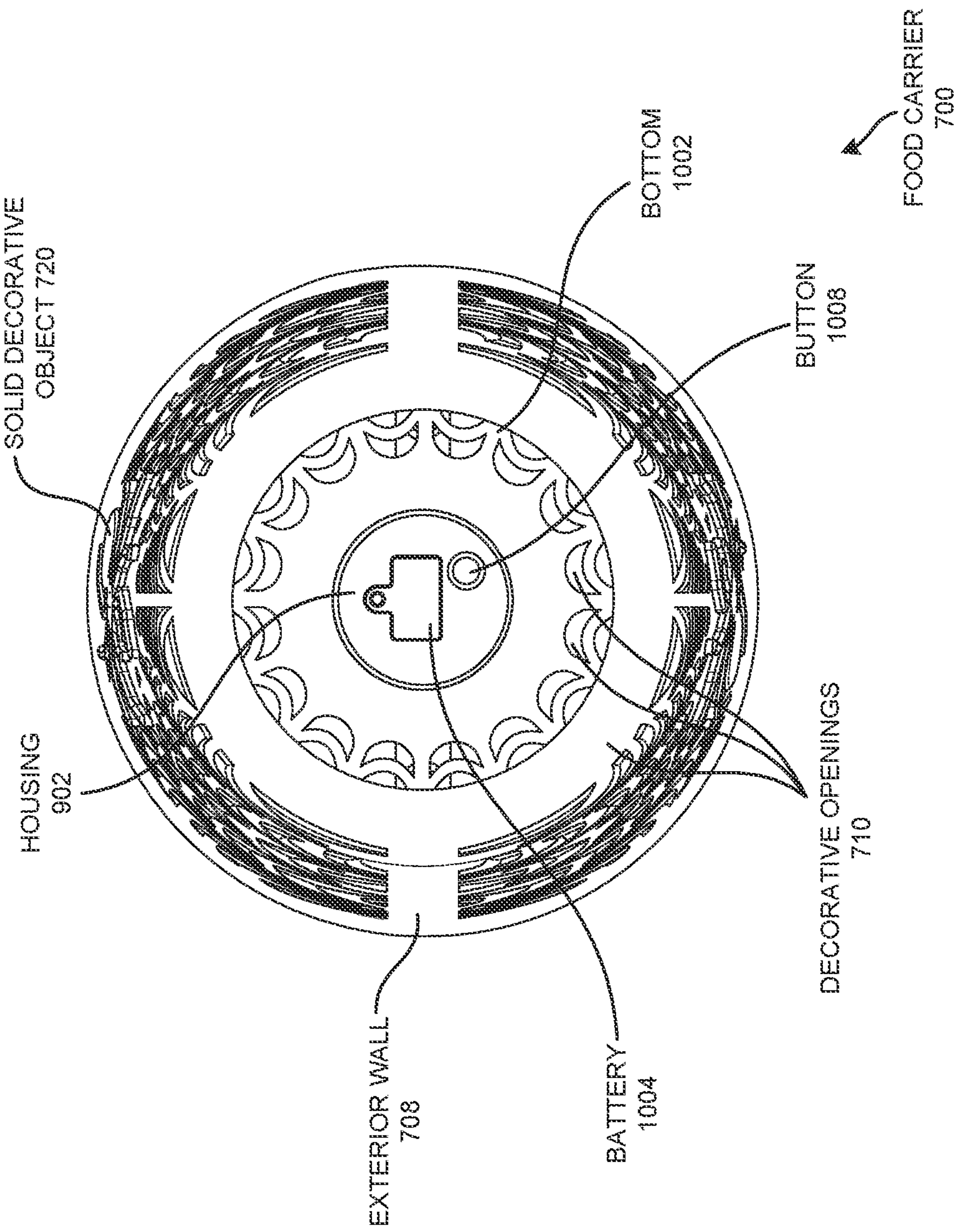
FIG. 10 is an upside-down view of the food carrier of FIG. 9 showing a bottom of the food carrier comprising the housing further comprising a button, according to one embodiment.

FIG. 10 is an upside-down view of the food carrier 700 of FIG. 9 showing a bottom 1002 of the food carrier 700 comprising the housing 902 further comprising a button 1008, according to one embodiment. FIG. 10 illustrates the food carrier 700 comprising the exterior wall 708, at least one decorative opening 710, the solid decorative object 720, the housing 902, a bottom 1002, a battery 1004, and a button 1008. The bottom 1002 may be an exterior of the surface 804 that acts as a base for the bucket 702. The bottom 1002 may allow the bucket 702 to stand upright and/or hold the contents inside from falling out. The bottom 1002 may be constructed from the translucent material suitable for supporting the weight and/or the contents of the bucket 702. The bottom 1002 may also feature a textured and/or non-slip surface to enhance stability when placed on various surfaces.

The battery 1004 may be a power source component including but not limited to lithium-ion and/or nickel-metal hydride. The battery 1004 may provide power output suitable for powering the light-emitting diode 906 over extended periods, even under varying environmental conditions. The battery 1004 may be designed for easy replacement or removal, facilitating recycling or disposal.

The button 1008 may be a switch to control the function of the bucket 702. The button 1008 may be a push-button switch, a slide switch, a toggle switch, a rocker switch, a dual in-line package switch, a tactile switch, a capacitive touch sensor, a proximity sensor, a rotary switch, and/or a soft power button. The button 1008 may be designed to control the electrical output from the battery 1004 to the light-emitting diode 906. The button 1008 may enable the user 724 to switch the light-emitting diode 906 between multiple modes, including but not limited to an OFF mode, a constant ON mode, and/or a flashing mode. The button 1008 may be positioned for easy access by the user 724 to control functions of the bucket 702.

The button 1008 may be constructed from a durable material that withstands repeated use and/or may offer a tactile response to confirm activation. The button 1008 may serve multiple functions including but not limited to turning the LED 906 ON and/or OFF, toggling between different lighting modes (e.g., constant, flashing), and/or adjusting the light intensity. Additionally, The button 1008 may be waterproof and/or dustproof to ensure reliable operation in various environments.

According to one embodiment, FIG. 10 discloses the housing 902 which may be affixed to the bottom 1002 of the bucket 702. The housing 902 may comprise the battery, 1004, the light-emitting diode 906 (not shown) and/or the button 1008. The battery may ensure a stable power supply for the light-emitting diode 906. The battery 1004 may be housed and/or affixed within the housing 902. The battery 1004 may provide the necessary power to the light-emitting diode 906 and/or other light sources associated with the bucket 702. The button 1008 may be integrated into the housing 902 which may be accessible on the exterior of housing 902. The button 1008 may be connected to the battery 1004 and/or the light-emitting diode 1006 to allow the user 724 to control the functions of the bucket 702.

Figure 11:
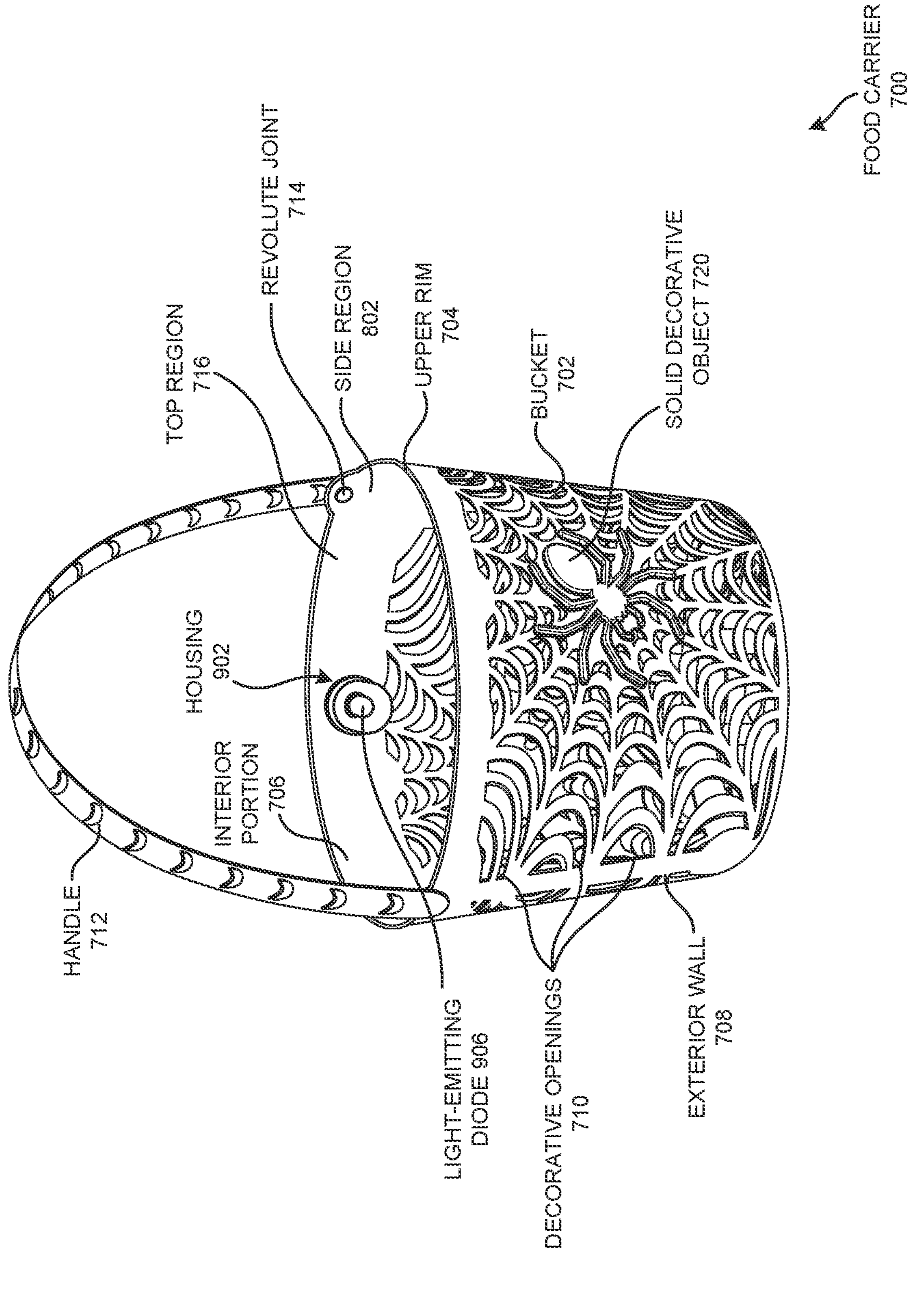
FIG. 11 is a side view of the food carrier of FIGS. 9 & 10 wherein the housing and its various components are attached to the side region of the bucket, according to one embodiment.

FIG. 11 is a side view of the food carrier 700 of FIGS. 9 & 10 wherein the housing 902 and its various components are attached to the side region 802 of the bucket 702, according to one embodiment. FIG. 11 illustrates the food carrier 700 comprising the bucket 702, the upper rim 704, the interior portion 706, the exterior wall 708, the at least one decorative opening 710 (e.g. holiday themes), the handle 712, the revolute joint 714, the top region 716, the circular opening 718, the solid decorative object 720, the non-attached illuminator 722, the side region 802, the housing 902, and the light-emitting diode 906.

According to one embodiment illustrated in FIG. 11, the housing 902 may be positioned at the top region 716 of the side region 802 (not shown) of the interior portion 706 of the bucket 702, which may facilitate optimal functionality and/or user 724 accessibility. This placement of the housing 902 may be designed to accommodate various components within the housing 902, including but not limited to the battery 1004 (not shown), the button 1008 (not shown), and/or the light-emitting diode 906.

By affixing the housing 902 to the top region 716 of the interior portion 706, the light from the light-emitting diode 906 may brighten the interior of the bucket 702 and/or radiate the light outward to the area and/or region exterior to the bucket 702. Positioning the housing 902 on the side region 802 may allow for a balanced distribution of light which may enhance the decorative patterns projected by the bucket 702. Positioning the housing 902 on the side region 802 may allow user 724 to easily access the button 1008 (not shown) and/or the battery 1004 (not shown) for maintenance and/or adjustments without needing to disturb the contents of the bucket 702.

This placement of the housing 902 in the bucket 702 may ensure that changing the battery 1004 and/or toggling the LED 906 light modes can be done quickly and/or conveniently. Attaching the housing 902 to the side region 802 may contribute to the overall durability and/or stability of the bucket 702. Placing the housing 902 on the side region 802 may minimize the risk of damage to the electronic components during use, as the side region 802 is less likely to encounter direct impacts compared to the bottom 1002 and/or the upper rim 704 of the bucket 702.

Figure 12:
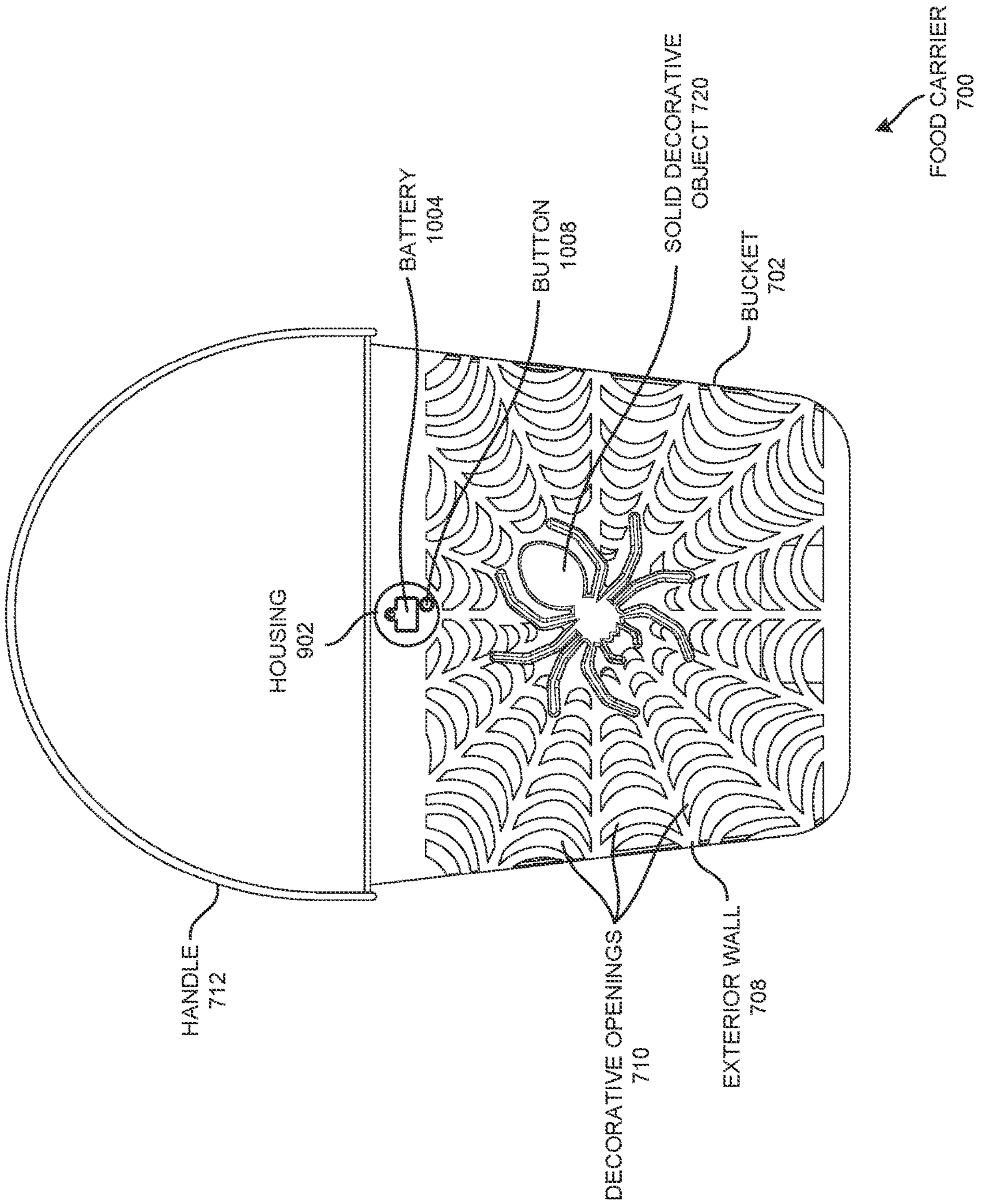
FIG. 12 is a side view of the exterior wall of the food carrier of FIGS. 9-11 wherein the housing and its various components are attached to the side region of the bucket, according to one embodiment.

FIG. 12 is a side view of the exterior wall 708 of the food carrier 700 of FIGS. 9-11 wherein the housing 902 and its various components are attached to the side region 802 of the bucket 702, according to one embodiment. FIG. 12 illustrates the food carrier 700 comprising the bucket 702, the exterior wall 708, the at least one decorative opening 710, the handle 712, the solid decorative object 720, the housing 902, the battery 1004, and the button 1008. According to one embodiment illustrated in FIG. 12, the housing 902, the battery 1004, and/or the button 1008 may be located at least on the exterior wall 708 opposite side of the side region 802 of the bucket 702. The housing 902 may be designed to integrate with the exterior wall 708 of the bucket 702 which may provide a compact and/or efficient solution for housing 902 the electrical components necessary for illumination. The housing 902 may be positioned on the exterior wall 708 of the bucket 702 to ensure ease of access for the user 724.

The housing 902 may be attached to the exterior of the bucket 702 through a combination of mechanical fastenings, adhesives, and/or precision-engineered alignment features. This positioning of the housing 902 may include snap-fit connections, screws, and/or brackets which may ensure attachment without compromising the aesthetic appeal of the bucket 702. The housing 902 may accommodate the battery 1004 and/or button 1008 in such a way that they are protected from environmental elements while remaining easily accessible for battery 1004 replacement and/or function control. The exterior placement of the housing 902 may be optimized to enhance functionality of the bucket 702 and/or user 724 experience which may ensure that the light source is effectively powered and/or controlled with minimal effort.

Figure 13:
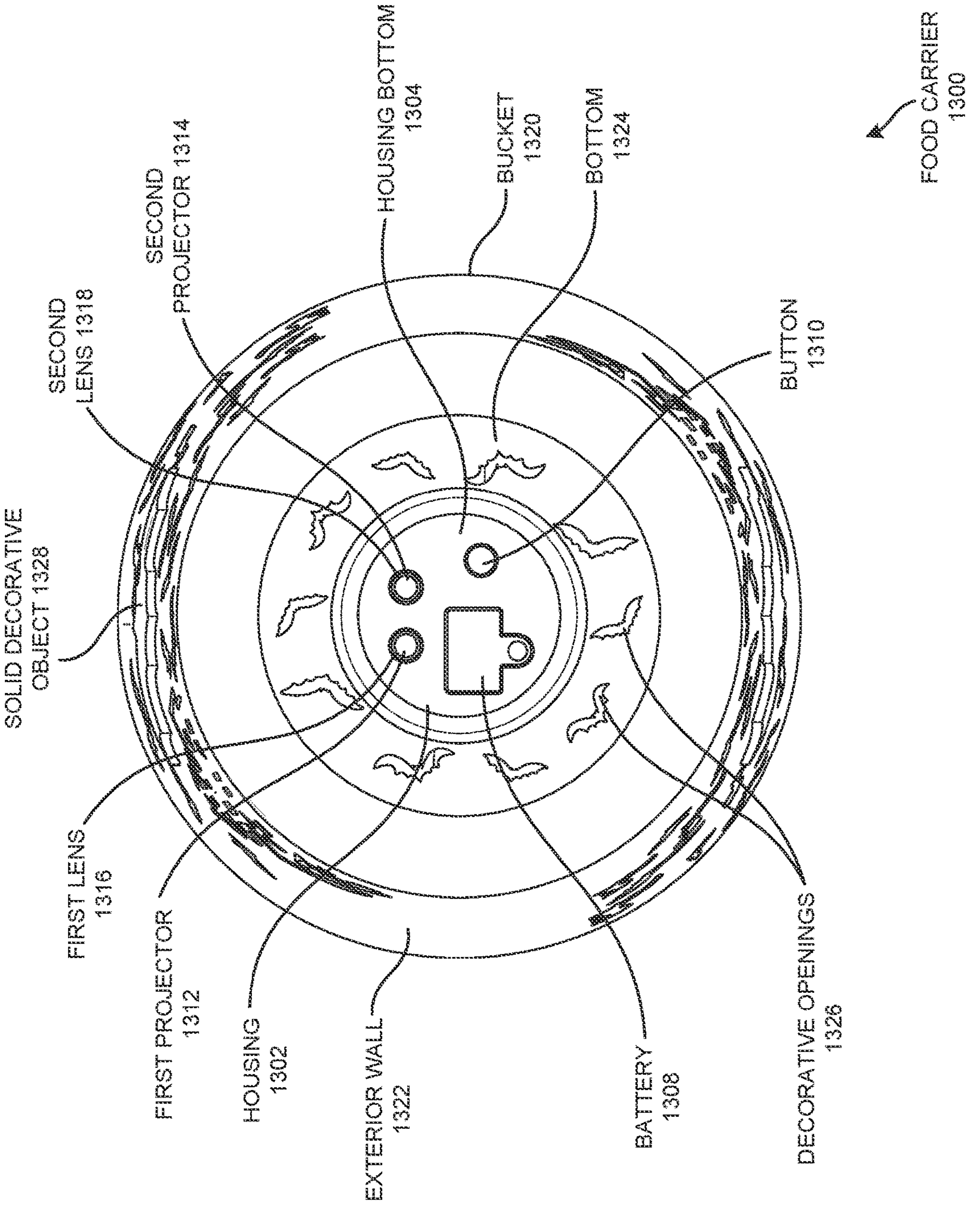
FIG. 13 is an alternative embodiment of the food carrier of FIGS. 1-12 wherein the housing further comprises a first projector and a second projector, according to one embodiment.

FIG. 13 is an alternative embodiment of the food carrier 1300 of FIGS. 1-12 wherein the housing 1302 further comprises a first projector 1312 and a second projector 1314, according to one embodiment. FIG. 13 illustrates a food carrier 1300 comprising a housing 1302, a housing bottom 1304, a battery 1308, a button 1310, a first projector 1312, a second projector 1314, a first lens 1316, a second lens 1318, a bucket 1320, an exterior wall 1322, a bottom 1324, a at least one decorative opening 1326, and a solid decorative object 1328. The housing bottom 1304 may be the base and/or bottom portion of the housing 1302 that encloses and/or supports the other components of the housing 1302. The housing bottom 1304 may provide a stable foundation and/or structural integrity for the entire housing assembly. The housing bottom 1304 may also serve as a mounting point and/or attachment surface for securing the housing 1302 to the bucket 1320. Additionally, The housing bottom 1304 may incorporate openings and/or slots for accessing components including but not limited to the battery 1304 and/or other internal elements.

The first projector 1312 may be a compact projection device and/or light source designed to project a decorative projection (not shown) and/or other light pattern onto a surface. The first projector 1312 may utilize advanced optics including but not limited to lenses and/or mirrors, to focus and/or shape the light emitted from an internal source (e.g., a light-emitting diode). The first projector 1312 may be positioned within the housing bottom 1304 to direct its projection towards a specific area and/or target surface which may create a first decorative projection 1402 (not shown) and/or other visual enhancement for the food carrier 1300 and/or the bucket 1320.

The second projector 1314 may be a compact projection device and/or light source positioned within the housing bottom 1304 of the housing 1302 adjacent to the first projector 1312. The second projector 1314 may comprise a light source (e.g. a light-emitting diode) that may project to an area outside of the bucket 1320. The second projector 1314 may be designed to project a second decorative projection 1314 (not shown) and/or pattern onto the same surface and/or area as the first projector 1312. The second projector 1314 may work in conjunction with the first projector 1312 to create a complementary and/or contrasting visual effect, adding depth, complexity, and/or versatility to the overall decorative projection.

The first lens 1316 may be an optical component coupled to the first projector 1312. The first lens 1316 may be a precision-crafted lens designed to shape, focus, and/or modify the light emitted from the first projector 1312 to achieve a desired projection pattern and/or image quality. The first lens 1316 may be made from high-quality materials including but not limited to glass and/or plastic, and may incorporate various optical properties (e.g., convex, concave, or aspherical) to control the projection characteristics. The first lens 1316 may comprise an emblem or other integrated component to create a shape within the first decorative projection 1402 (not shown). This integrated component of the first lens 1316 may create a shape including but not limited to a bat, a pumpkin, witch, a snowflake, a shamrock, an easter bunny, and/or a flag. The first lens 1316 may be at least partially embedded within the housing 1302.

The second lens 1318 may be an optical component coupled to the second projector 1314. The second lens 1318 may be designed to shape, focus, and/or modify the light emitted from the second projector 1314 to achieve a distinct projection pattern and/or image quality. The second lens 1318 may be made from high-quality materials including but not limited to glass and/or plastic, and may incorporate various optical properties (e.g., convex, concave, or aspherical) to control the projection characteristics. The second lens 1318 may comprise an emblem or other integrated component to create a shape within the second decorative projection 1404 (not shown). This integrated component of the second lens 1318 may create a shape including but not limited to a bat, a pumpkin, witch, a snowflake, a shamrock, an easter bunny, and/or a flag. The second lens 1318 may be at least partially embedded within the housing 1302.

According to one embodiment, FIG. 13 discloses the first projector 1312 and/or the second projector 1314 on the housing bottom 1304. The first projector 1312 and/or the second projector 1314 may be embedded within the housing 1302. The first projector 1312 and/or the second projector 1314 may be at least partially embedded within the housing 1302. The first projector 1312 and/or the second projector 1314 may be adjacent to the battery 1308 and/or the button 1310. The first projector 1312 may comprise the first lens 1316. The second projector 1314 may comprise the second lens 1318. The first projector 1312 and/or the second projector 1314 may be powered by the battery 1308. When powered by the battery 1308, the first projector 1312 may emit a first decorative projection 1402 (not shown) through the first lens 1316 to the area and/or region exterior to the bucket 1320 and/or the food carrier 1300. Furthermore, when powered by the battery 1308, the second projector 1314 may emit a second decorative projection 1404 (not shown) through the second lens 1318 to the area and/or region exterior to the bucket 1320 and/or the food carrier 1300. The button 1310 may toggle the first projector 1312 and/or the second projector 1314 between different timer settings, different brightness settings, and/or other lighting settings. The first projector 1312 and/or the second projector 1314 may alternate between an off mode and/or an on mode which may provide a decorative projected effect to the area and/or region exterior to the bucket 1302.

The housing bottom 1304 may provide a stable base for the entire housing assembly 1302 and/or the bucket 1320. The housing bottom 1304 may comprise openings to access the battery 1308. The battery 1308 may power the first projector 1312, the second projector 1314, and/or other LEDs. The first projector 1312 and/or second projector 1314 may be compact light projection units that receive power from the battery 1308 installed within the housing 1302. The button 1310 may allow the user 120 (not shown) to control and/or cycle through different operating modes including but not limited to OFF mode, constant ON mode, and/or flashing mode for the projectors 1312, 1314. The first lens 1316 and/or the second lens 1318 may comprise emblems, textured surfaces, etchings and/or embedded designs that allow them to project shapes, icons and/or graphics when light of the projectors 1312, 1314 passes through them. This may enable the first decorative projection 1402 (not shown) and/or second decorative projection 1404 (not shown) to be visible to the user 120 (not shown).

Figure 14A:
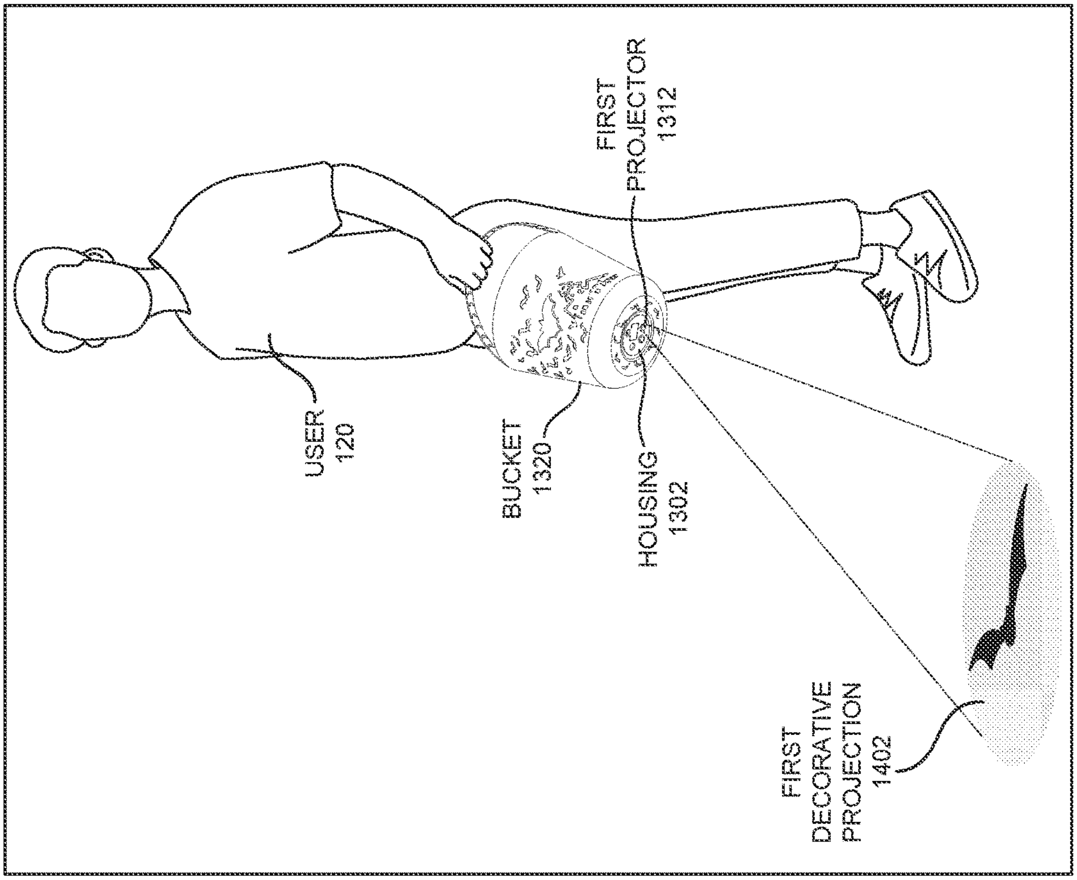
FIGS. 14A and 14B are operational views of the food carrier of FIG. 13 wherein the first projector and the second projector alternate between an on and off configuration, according to one embodiment.
Figure 14B:
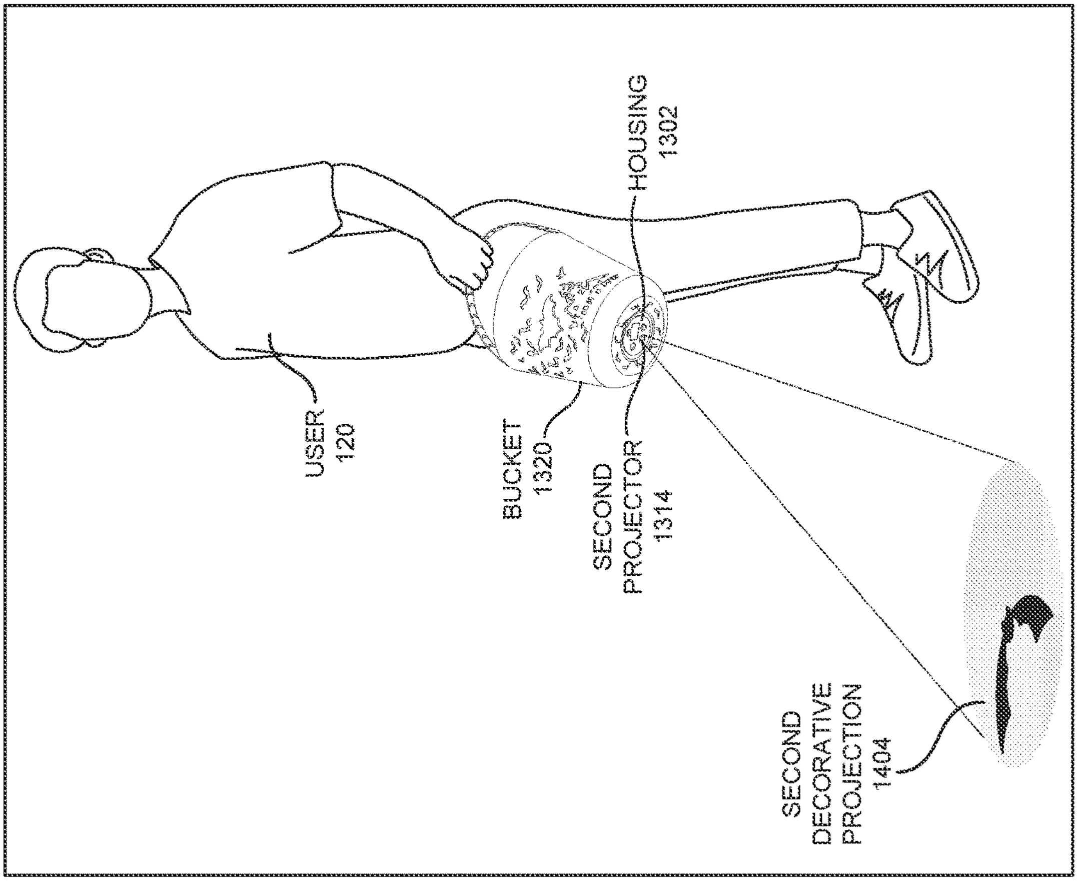

FIGS. 14A and 14B are operational views of the food carrier 1300 of FIG. 13 wherein the first projector 1312 and/or the second projector 1314 alternate between an on and/or off configuration, according to one embodiment. FIGS. 14A and 14B illustrate the user 120, the housing 1302, the first projector 1312, the second projector 1314, the bucket 1320, a first decorative projection 1402, and a second decorative projection 1404.

The first decorative projection 1402 may be a visual pattern, image and/or design cast onto a surface by the first projector 1312 passing through the first lens 1316. The first decorative projection 1402 may be a dynamic projection that can be adjusted in brightness, color, and/or animation effects through the different operating modes controlled by the button 1310. The first decorative projection 1402 may be directed downwards but may also illuminate the interior portion 706 and/or bottom surface of the bucket 1320. The appearance of the first decorative projection 1402 (including but not limited to its shape, emblem, and/or graphics) may be determined by the optical characteristics of the first lens 1316, which may mold the light from the first projector 1312 into the desired decorative pattern.

The second decorative projection 1404 may be a visual pattern, image and/or design cast onto a surface by the second projector 1314 passing through the second lens 1318. The second decorative projection 1404 may be a dynamic projection that can be adjusted in brightness, color, and/or animation effects through the different operating modes controlled by the button 1310. The second decorative projection 1404 may be directed downwards but may also illuminate the interior portion 706 and/or bottom surface of the bucket 1320. The appearance of the second decorative projection 1404 (including but not limited to its shape, emblem, and/or graphics) may be determined by the optical characteristics of the second lens 1318, which may mold the light from the second projector 1314 into the desired decorative pattern.

According to one embodiment, FIG. 14A discloses the first decorative projection 1402 which may be visible, indicating that the first projector 1312 may be active and/or illuminated. Conversely, the second decorative projection 1404 may be not present, suggesting that the second projector 1314 may be turned off and/or in an inactive state. This configuration of projectors 1312, 1314 may allow for selective illumination, highlighting different areas and/or aspects of the bucket 1320 as desired.

The downward projection angle of the first decorative projection 1402 may be intentionally designed to provide focused illumination and/or decorative enhancement within the immediate vicinity of the bucket 1320. This downward angle may be achieved through the precise positioning and/or alignment of the first projector 1312, the first lens 1316, and/or other optical/lighting components within the housing 1302. Additionally, the optical properties of the first lens 1316 may be engineered to direct and/or shape the light projection in a downward direction.

The second decorative projection 1404 may be a separate visual pattern, image and/or design cast by the second projector 1314 passing through the second lens 1318. The second decorative projection 1404 may be angled differently than the first decorative projection 1402, potentially illuminating the exterior wall 1322 of the bucket 1320. This outward projection angle may create a visually striking effect, drawing attention to the silhouette or at least one decorative opening 1326.

According to one embodiment, FIG. 14B discloses the opposite scenario of the FIG. 14A, wherein the second decorative projection 1404 may be visible, indicating that the second projector 1314 may be active and/or illuminated, while the first decorative projection 1402 may be not present, suggesting that the first projector 1312 may be turned off and/or inactive.

The outward projection angle of the second decorative projection 1404 may be intended to create a more ambient and/or environmental lighting effect, potentially highlighting and/or accentuating the surrounding area beyond the immediate vicinity of the bucket 1320. This outward angle may be facilitated by the strategic placement and/or orientation of the second projector 1314, the second lens 1318, and/or other optical/lighting components within the housing 1302, as well as the specific optical design of the second lens 1318.

Figure 15:
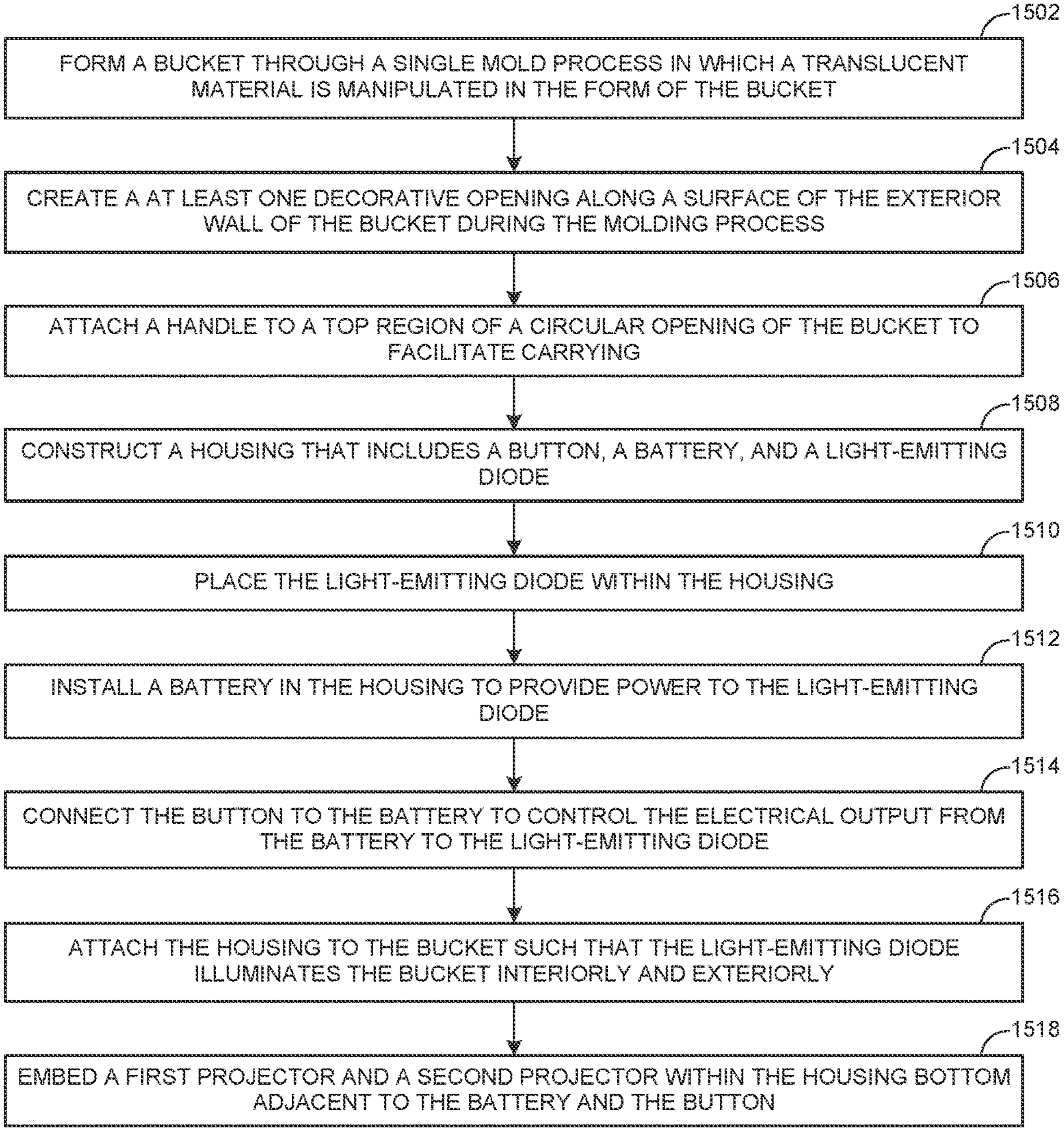
FIG. 15 is a process flow diagram describing a method of manufacturing the food carrier of FIGS. 1-14B, according to one embodiment.

FIG. 15 is a process flow diagram describing a method of manufacturing the food carrier of FIGS. 1-14B, according to one embodiment. In operation 1502, a bucket may be formed through a single mold process in which a translucent material is manipulated in the form of the bucket. In operation 1504, at least one decorative opening may be created along a surface of the exterior wall of the bucket during the molding process. In operation 1506, a handle may be attached to a top region of a circular opening of the bucket to facilitate carrying. In operation 1508, a housing may be constructed that includes a button, a battery, and/or a light-emitting diode. In operation 1510, the light-emitting diode may be placed within the housing. In operation 1512, a battery may be installed in the housing to provide power to the light-emitting diode. In operation 1514, the button may be connected to the battery to control the electrical output from the battery to the light-emitting diode. In operation 1516, the housing may be attached to the bucket such that the light-emitting diode illuminates the bucket interiorly and/or exteriorly. In operation 1518, a first projector and/or a second projector may be embedded within the housing bottom adjacent to the battery and/or the button.

The dark, ghoulish elements of Halloween may be what excite most people about the holiday, but these elements may also present considerable risks and dangers for participants, especially children. Walking at night in the dark may be inherently dangerous, but it may be even more so on holiday nights. On holidays such as Halloween, drivers may be more likely to be under the influence and pedestrians may be more likely to be dressed in dark, hard-to-see clothing. Despite the considerable risks and dangers involved with walking in public on Halloween, children continue to dress in dark costumes and ignore the need for personal visual indicators. Children, while dressed in their Halloween attire, often fail to obey traffic and/or pedestrian laws and ordinances. Children may also often fail to use common sense such as looking both ways before crossing a road and/or using a crosswalk. These failures may result not only from a lack of knowledge of laws and the rules of the road, but also from the excitement that Halloween festivities may bring. Children may be playing with friends, searching for their next house to trick-or-treat at, and/or running around aimlessly as a result of their elevated blood sugar.

As a result of failing to properly obey the rules of the road and/or use common walking sense, children may become the victim of traffic accidents. The embodiments of FIGS. 1-15 may remedy the risks involved with Halloween night and help to protect children from themselves and from the hidden dangers around them. The embodiments of FIGS. 1-15 produce lighting that may be seen by those driving automobiles, which may increase the likelihood the child is seen by the driver which may decrease the likelihood of an accident. The embodiments of FIGS. 1-15 may enable children to supplant the use of items such as hand held flash lights, headlamps, reflective vests, and/or reflective headwear because it provides the user with both a receptacle to place their gathered goods and a light source which makes themselves more visible to others. The embodiments of FIGS. 1-15 may enable users to have a free hand with using the device, which may assist with candy retrieval and/or may allow a chaperone to hold the hand of the child, which further protects them from unforeseen danger.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. An apparatus comprising:

a bucket formed of a translucent material in which a light source within the bucket illuminates the bucket interiorly and exteriorly, wherein the translucent material of the bucket permits the light from the light source to pass through the bucket to a region exterior to the bucket; and at least one decorative opening along a surface of an exterior wall to permit the light to pass through to the region exterior to the bucket, which generates a decorative silhouette that emanates from the exterior wall of the bucket and projects to the region exterior to the bucket.

2. The apparatus of claim 1 further comprising:

a light-emitting diode affixed substantially on an interior portion of the bucket serving as the light source.

3. The apparatus of claim 2 further comprising:

a battery that provides an electrical current for the light-emitting diode.

4. The apparatus of claim 3 further comprising:

a housing comprising a button, a battery, and the light-emitting diode, wherein the battery is stored in the housing, wherein the light-emitting diode is affixed within the housing, wherein the housing is at least partially translucent to allow light to pass through the bucket to the region exterior to the bucket, and wherein the button controls the battery's electrical output to the light-emitting diode.

5. The apparatus of claim 4 further comprising:

a first projector on a housing bottom, wherein the first projector is at least partially embedded within the housing, wherein the first projector comprises a first lens, wherein the first projector is powered by the battery, and wherein when powered by the battery, the first projector emits a first decorative projection through the first lens to the region exterior to the bucket.

6. The apparatus of claim 4 further comprising:

a second projector on the housing bottom, wherein the second projector is at least partially embedded within the housing, wherein the second projector comprises a second lens, wherein the second projector is powered by the battery, and wherein when powered by the battery, the second projector emits a second decorative projection through the second lens to the region exterior to the bucket.

7. The apparatus of claim 6 wherein the first projector and the second projector alternate between an off mode and an on mode providing a decorative projected effect to the region exterior to the bucket.

8. The apparatus of claim 1 further comprising:

a handle attached to a top region of a circular opening of the bucket.

9. A method of manufacturing a food carrier comprising:

forming a bucket through a single mold process in which a translucent material is manipulated in a form of the bucket, wherein the translucent material is a material in which a light within the bucket illuminates the bucket interiorly and exteriorly;

creating a at least one decorative opening along a surface of an exterior wall of the bucket during the molding process, wherein the at least one decorative opening is designed to generate a decorative silhouette that emanates from the bucket and projects to the exterior of the bucket;

attaching a handle to a top region of a circular opening of the bucket to facilitate carrying, wherein the handle is attached to the bucket via a revolute joint;

constructing a housing that includes a button, a battery, and a light-emitting diode;

wherein the housing is at least partially translucent to allow light to pass through the housing to the bucket;

placing the light-emitting diode within the housing;

installing a battery in the housing to provide power to the light-emitting diode;

connecting the button to the battery to control the electrical output from the battery to the light-emitting diode; and attaching the housing to the bucket such that the light-emitting diode illuminates the bucket interiorly and exteriorly.

10. The method of claim 9 further comprising:

embedding a first projector and a second projector within the housing bottom adjacent to the battery and the button, wherein the first projector comprises a first lens, wherein the second projector comprises a second lens, wherein the first projector and the second projector are powered by the battery, wherein when powered by the battery, the first projector emits a first decorative projection through the first lens to a region exterior to the bucket, wherein when powered by the battery, the second projector emits a second decorative projection through the second lens to the region exterior to the bucket, and wherein the first projector and the second projector alternate between an off mode and an on mode providing a decorative projected effect automatically to the region exterior to the bucket.

11. An apparatus comprising:

a bucket formed of a translucent material, and a housing at a bottom of the bucket comprising a button, a power source, a first projector, and a second projector, wherein the first projector is powered by the power source, wherein, when powered by the power source, the first projector emits a first decorative projection to a region exterior to the bucket, wherein, the second projector is powered by the power source, wherein, when powered by the power source, the second projector emits a second decorative projection to the region exterior to the bucket, and wherein, the first decorative projection and the second decorative projection are directed downwards.

12. The apparatus of claim 11 wherein:

the first projector comprises a first lens, when powered by the power source, the first projector emits the first decorative projection through the first lens to the region exterior to the bucket.

13. The apparatus of claim 11 wherein:

the second projector comprises a second lens, and when powered by the power source, the second projector emits the second decorative projection through the second lens to the region exterior to the bucket.

14. The apparatus of claim 11 further comprising:

a light source within the bucket that illuminates the bucket interiorly and exteriorly, wherein the translucent material of the bucket permits the light from the light source to pass through the bucket to the region exterior to the bucket.

15. The apparatus of claim 14 further comprising:

a light-emitting diode is the light source, wherein the power source provides an electrical current for the light-emitting diode.

16. The apparatus of claim 14 further comprising:

at least one decorative opening along a surface of an exterior wall of the bucket, wherein the at least one decorative openings permits the light from the light source to pass through to the region exterior to the bucket, which generates a decorative silhouette that emanates from the exterior wall of the bucket and projects to the region exterior to the bucket.

17. The apparatus of claim 11 wherein:

the first projector and the second projector are at least partially embedded within the housing.

18. The apparatus of claim 11 wherein:

the button controls the power source's electrical output to the first projector and the second projector.

19. The apparatus of claim 11 wherein:

the housing is located at a center region of the bucket.

20. The apparatus of claim 11 wherein:

the first projector and the second projector alternate between an off mode and an on mode providing a decorative projected effect to the region exterior to the bucket.

* * * * *